US009843339B1

(12) United States Patent
Kuan et al.

(10) Patent No.: US 9,843,339 B1
(45) Date of Patent: Dec. 12, 2017

(54) ASYNCHRONOUS PULSE DOMAIN TO SYNCHRONOUS DIGITAL DOMAIN CONVERTER

(71) Applicant: HRL Laboratories, LLC, Malibu, CA (US)

(72) Inventors: Yen-Cheng Kuan, Los Angeles, CA (US); Randall White, Calabasas, CA (US); Zhiwei A. Xu, Davis, CA (US); Donald A. Hitko, Olney, MD (US); Peter Petre, Oak Park, CA (US); Jose Cruz-Albrecht, Oak Park, CA (US); Alan E. Reamon, Woodland Hills, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 15/248,358

(22) Filed: Aug. 26, 2016

(51) Int. Cl.
H03M 1/12 (2006.01)
H03M 1/10 (2006.01)
G06F 1/12 (2006.01)
G06F 1/04 (2006.01)

(52) U.S. Cl.
CPC ............... *H03M 1/12* (2013.01); *G06F 1/04* (2013.01); *G06F 1/12* (2013.01); *H03M 1/1071* (2013.01)

(58) Field of Classification Search
CPC ......... H03M 1/12; H03M 1/1071; G06F 1/04; G06F 1/12
USPC .......................................... 341/155; 713/500
See application file for complete search history.

(56) References Cited

U.S. PATENT DOCUMENTS

| 4,079,240 A | * | 3/1978 | Rynkowski | ........ G06K 7/10871 235/462.28 |
| 4,087,681 A | * | 5/1978 | Spencer | ............... G06K 7/0166 235/462.28 |
| 4,383,248 A | | 5/1983 | Smith | |
| 4,586,189 A | | 4/1986 | Tyrrell | |

(Continued)

FOREIGN PATENT DOCUMENTS

CN  101971166 A  2/2011

OTHER PUBLICATIONS

U.S. Appl. No. 14/834,837, Kuan et al., filed Aug. 25, 2015.

(Continued)

*Primary Examiner* — Brian Young
(74) *Attorney, Agent, or Firm* — Ladas & Parry

(57) ABSTRACT

An asynchronous pulse domain to synchronous digital domain converter for converting pulse domain signals in an input asynchronous pulse domain data stream to synchronous digital domain signals in a data output stream. The converter comprises a plurality of counters arranged in a ring configuration with only one counter in the ring being responsive at any given time to positive and negative going pulses in the input asynchronous pulse domain data stream, each counter, when so responsive, counting a number of time units between either (i) a positive going pulse and an immediately following negative going pulse or (ii) a negative going pulse and an immediately following positive going pulse, the counts of the counters when so responsive being synchronously converted to synchronous digital domain signals in the data output stream. The disclosed asynchronous pulse domain to synchronous digital domain converter can be used with spike domain signals if desired.

20 Claims, 18 Drawing Sheets

(56) References Cited

U.S. PATENT DOCUMENTS

| | | | |
|---|---|---|---|
| 4,939,515 A | 7/1990 | Adelson | |
| 5,185,715 A | 2/1993 | Zikan et al. | |
| 5,268,934 A | 12/1993 | Sharma et al. | |
| 5,345,398 A | 9/1994 | Lippmann et al. | |
| 5,396,244 A | 3/1995 | Engel | |
| 5,479,170 A | 12/1995 | Cauwenberghs et al. | |
| 5,490,062 A | 2/1996 | Leach et al. | |
| 5,522,048 A | 5/1996 | Offord | |
| 5,566,099 A | 10/1996 | Shimada | |
| 5,815,102 A | 9/1998 | Melanson | |
| 5,894,280 A | 4/1999 | Ginetti et al. | |
| 5,910,763 A | 6/1999 | Flanagan | |
| 6,065,082 A * | 5/2000 | Blair | G06F 13/00 709/200 |
| 6,087,968 A | 7/2000 | Roza | |
| 6,111,531 A | 8/2000 | Farag | |
| 6,172,536 B1 | 1/2001 | Yoshihara | |
| 6,452,524 B1 | 9/2002 | Fraleigh et al. | |
| 6,473,019 B1 | 10/2002 | Ruha et al. | |
| 6,492,798 B2 | 12/2002 | Sunter | |
| 6,940,438 B2 | 9/2005 | Koe et al. | |
| 6,961,863 B2 * | 11/2005 | Davies | G06F 13/4059 370/395.1 |
| 6,975,682 B2 | 12/2005 | Cosand | |
| 7,038,608 B1 | 5/2006 | Gilbert | |
| 7,148,829 B2 | 12/2006 | Inukai | |
| 7,180,432 B2 | 2/2007 | Oliaei | |
| 7,184,359 B1 | 2/2007 | Bridgewater | |
| 7,253,761 B1 | 8/2007 | Hoyos et al. | |
| 7,277,797 B1 | 10/2007 | Kunitsyn et al. | |
| 7,324,035 B2 | 1/2008 | Harris et al. | |
| 7,403,144 B1 | 7/2008 | Cruz-Albrecht et al. | |
| 7,405,686 B2 | 7/2008 | Laraia et al. | |
| 7,515,084 B1 | 4/2009 | Cruz-Albrecht et al. | |
| 7,573,956 B2 | 8/2009 | Lazar et al. | |
| 7,583,213 B2 | 9/2009 | Wang et al. | |
| 7,592,939 B1 | 9/2009 | Cruz-Albrecht | |
| 7,724,168 B1 | 5/2010 | Cruz-Albrecht et al. | |
| 7,750,835 B1 | 7/2010 | Cruz-Albrecht et al. | |
| 7,822,698 B1 | 10/2010 | Cruz-Albrecht et al. | |
| 7,965,216 B1 | 6/2011 | Petre et al. | |
| 7,996,452 B1 | 8/2011 | Cruz-Albrecht et al. | |
| 8,169,212 B2 | 5/2012 | Rivoir | |
| 8,566,265 B1 | 10/2013 | Cruz-Albrecht et al. | |
| 8,595,157 B2 | 11/2013 | Cruz-Albrecht et al. | |
| 9,082,075 B1 | 7/2015 | Cruz-Albrecht et al. | |
| 9,154,172 B1 | 10/2015 | Cruz-Albrecht et al. | |
| 9,484,918 B1 | 11/2016 | Kuan et al. | |
| 2005/0190865 A1 | 9/2005 | Lazar et al. | |
| 2006/0087467 A1 | 4/2006 | Itskovich | |
| 2006/0092059 A1 | 5/2006 | Guimaraes | |
| 2007/0069928 A1 | 3/2007 | Gehring et al. | |
| 2009/0303070 A1 | 12/2009 | Zhang et al. | |
| 2010/0225824 A1 | 9/2010 | Lazar et al. | |
| 2010/0321064 A1 | 12/2010 | Mathe | |
| 2011/0004579 A1 | 1/2011 | Snider | |
| 2011/0028141 A1 | 2/2011 | Yang et al. | |
| 2012/0213531 A1 | 8/2012 | Nazarathy et al. | |

OTHER PUBLICATIONS

X. Kong et al., "A Time-Encoding Machine Based High-Speed Analog-to-Digital Converter", IEEE Journal on Emerging and Selected Topics in Circuits and Systems, vol. 2, No. 3, Sep. 2012.
U.S. Appl. No. 11/595,107, Cruz-Albrecht et al., filed Nov. 10, 2006.
U.S. Appl. No. 11/726,484, Cruz-Albrecht et al., filed Mar. 22, 2007.
U.S. Appl. No. 11/726,860, Cruz-Albrecht et al., filed Mar. 23, 2007.
U.S. Appl. No. 12/118,475, Cruz-Albrecht et al., filed May 9, 2008.
U.S. Appl. No. 12/262,691, Petre et al., filed Oct. 31, 2008.
U.S. Appl. No. 12/262,782, Cruz-Albrecht et al., filed Oct. 31, 2008.
U.S. Appl. No. 12/266,299, Cruz-Albrecht et al., filed Nov. 6, 2008.
U.S. Appl. No. 13/044,922, Cruz-Albrecht et al., filed Mar. 10, 2011.
U.S. Appl. No. 13/151,763, Cruz-Albrecht et al., filed Jun. 2, 2011.
U.S. Appl. No. 14/032,082, Cruz-Albrecht et al., filed Sep. 19, 2013.
U.S. Appl. No. 14/144,903, Cruz-Albrecht et al., filed Dec. 31, 2013.
U.S. Appl. No. 14/834,837, Cruz-Albrecht et al., filed Aug. 25, 2015.
"Relaxation Oscillator." Wikipedia: The Free Encyclopedia. Wikimedia Foundation, Inc. Jun. 18, 2010. Web. Mar. 11, 2015. <http://en.wikipedia.org/wiki/Relaxation oscillator>.
"Vander Pol Oscillator." Wikipedia: The Free Encyclopedia. Wikimedia Foundation, Inc. Jun. 18, 2010. Web. Mar. 11, 2015. <http://en.wikipedia.org/wikiNan der Pol oscillator>.
Cruz, J.M., et al., "A 16×16 Cellular Nueral Network Universal Chip: The First Complete Single-Chip Dynamic computer Array with Distributed Memory and with Gray Scale Input-Output," Analog Integrated Circuits and Signal Processing, 15, 227-237 (1998).
Dighe, A.M., et al., "An Asynchronous Serial Flash Converter", 9lh Int. Conf on Electronics, Circuits and Systems, IEEE, pp. 13-15, 2002.
Donoho, D., "Compressed Sensing," IEEE Transactions on Information Theory, vol. 42, No. 4, pp. 1289-1306, Apr. 2006.
Hasler et al,"VLSI Neural Systems and Circuits" 1990 IEEE. Wang et al "Review of pulse-coupled neural networks" 2009. pp. 31-37.
Indiveri, "A Low-Power Adaptive Integrated-and-fire Neuron Circuit", IEEE International Symposium on Circuits and Systems, vol. IV, pp. 820-823, 2003.
Iwamoto, M., et al., "Bandpass Delta-Sigma Class-S Amplifier," Electronic Letters, vol. 36, No. 12, pp. 1010-1012 (Jun. 2000).
Izhikevich: "Simple model of spiking neurons", IEEE Transactions on Neural Networks, IEEE Service Center, Piscataway, NJ, US, val. 14, No. 6, Nov. 1, 2003 (Nov. 1, 2003), pp. 1569-1572.
Izhikevich, "Which Model to Use for Cortical Spiking Neurons?", IEEE Trans. on Neural Networks, vol. 15, No. 5, Sep. 2004.
Keane, J. and L Atlas, "Impulses and stochastic arithmetic for signal processing," Proc. 2001 IEEE International Conference on Acoustics, Speech, and Signal Processing, pp. 1257-1260, 2001.
Laurent Perrinet ("Emergence of filters from natural scenes in a sparse spike coding scheme" 2004), pp. 821-826.
Lazar, A. and L. Toth, "Perfect Recovery and Sensitivity Analysis of Time Encoded Bandlimited Signals," IEEE Trans. on Circuits and Systems-I, vol. 51, No. 10, pp. 2060-2073, Oct. 2004.
Ouzounov, S., et al. "Design of High-Performance Asynchronous Sigma Delta Modulators with a Binary Quantizer with Hysteresis", IEEE 2004 Custom Integrated Circuits Conference, 2004, pp. 181-184.
Raisanen-Ruotsalainen, Elvi, Rahkonen, Timo, and Kostamovaara, Juha, "An Integrated Time-to-Digital Converter with 30-ps Single-Shot Precision," IEEE Journal of Solid-State Circuits, vol. 35, No. 10, pp. 1507-1510, (Oct. 2000).
Roza, E. Analog to Digital Conversion via Duty cycle Modulation, IEEE trans. Ojn Circuits and Systems-II, vol. 44, No. II, pp. 907-914 (Nov. 1997).
Walden, R., "Analog to Digital Converter Survey and Analysis," IEEE Journal on Selected Areas in Communications, vol. 17, No. 4, pp. 539-550 (Apr. 1999).
Wang et al., "Review of pulse-coupled neural networks," Image and Vision Computing 28, pp. 5-13, (June OS, 2009).
Xia Y. and J. Wang, "A Recurrent Neural Network for Solving Nonlinear Convex Programs Subject to Linear Constraints," IEEE Trans. on Neural Networks, vol. 16, No. 2, Mar. 2005.
From PCT/US2012/040043, International Preliminary Report on Patentability dated Dec. 2, 2013.
From PCT/US2012/040043, International Search Report and Written Opinion dated Jan. 14, 2013.
From EPO Application No. 12793584.9, EPO Supplementary Search Report and Written Opinion dated Jun. 14, 2016.
From PRC Application No. 2012800256873, Office Action dated Aug. 22, 2016 with brief English summary.

(56) References Cited

OTHER PUBLICATIONS

From PRC Application No. 2012800256873, Office Action dated Mar. 9, 2016 with brief English summary.
From U.S. Appl. No. 11/595,107 (now U.S. Pat. No. 7,996,452), Final Office Action dated Nov. 29, 2010.
From U.S. Appl. No. 11/595,107 (now U.S. Pat. No. 7,996,452), Notice of Allowance dated Apr. 4, 2011.
From U.S. Appl. No. 11/595,107 (now U.S. Pat. No. 7,996,452), Office Action dated Jun. 24, 2010.
From U.S. Appl. No. 11/726,484 (now U.S. Pat. No. 7,515,084), Ex Parte Quayle dated Sep. 10, 2008.
From U.S. Appl. No. 11/726,484 (now U.S. Pat. No. 7,515,084), Notice of Allowance dated Dec. 2, 2008.
From U.S. Appl. No. 11/726,484 (now U.S. Pat. No. 7,515,084), Restriction Requirement dated May 22, 2008.
From U.S. Appl. No. 11/726,860 (now U.S. Pat. No. 7,822,698), Restriction Requirement dated Mar. 8, 2010.
From U.S. Appl. No. 11/726,860 (now U.S. Pat. No. 7,822,698), Notice of Allowance dated Jun. 11, 2010.
From U.S. Appl. No. 12/118,475 (now U.S. Pat. No. 7,592,939), Notice of Allowance dated May 22, 2009.
From U.S. Appl. No. 12/262,691 (now U.S. Pat. No. 7,965,216), Notice of Allowance dated Feb. 17, 2011.
From U.S. Appl. No. 12/262,691 (now U.S. Pat. No. 7,965,216), Office Action dated Apr. 7, 2010.
From U.S. Appl. No. 12/262,691 (now U.S. Pat. No. 7,965,216), Office Action dated Aug. 23, 2010.
From U.S. Appl. No. 12/262,782 (now U.S. Pat. No. 7,724,168), Notice of Allowance dated Jan. 11, 2010.
From U.S. Appl. No. 12/266,299 (now U.S. Pat. No. 7,750,835), Notice of Allowance dated Mar. 22, 2010.
From U.S. Appl. No. 12/266,299 (now U.S. Pat. No. 7,750,835), Supplemental Notice of Allowance dated Jun. 22, 2010.
From U.S. Appl. No. 13/044,922 (now U.S. Pat. No. 8,566,265), Restriction Requirement dated Apr. 26, 2013.
From U.S. Appl. No. 13/044,922 (now U.S. Pat. No. 8,566,265), Notice of Allowance dated Jun. 20, 2013.
From U.S. Appl. No. 13/151,763 (now U.S. Pat. No. 8,595,157), Notice of Allowance dated Jul. 18, 2013.
From U.S. Appl. No. 14/144,903 (now U.S. Pat. No. 9,154,172), Notice of Allowance dated Jun. 1, 2015.
From U.S. Appl. No. 14/144,903 (now U.S. Pat. No. 9,154,172), Office Action dated Dec. 12, 2014.
From U.S. Appl. No. 14/032,082 (now U.S. Pat. No. 9,082,075), Office Action dated Sep. 10, 2014.
From U.S. Appl. No. 14/032,082 (now U.S. Pat. No. 9,082,075), Office Action dated Mar. 9, 2015.
From U.S. Appl. No. 14/834,837 (now U.S. Pat. No. 9,484,918) Notice of Allowance dated Jul. 5, 2016.

* cited by examiner

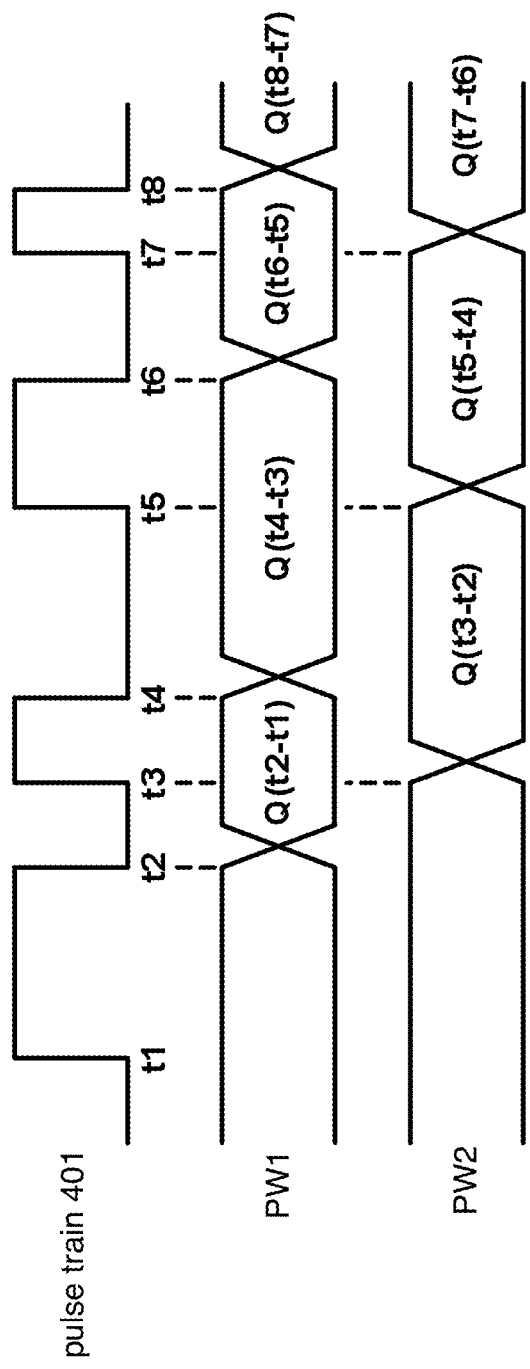

US 9,843,339 B1

ASYNCHRONOUS PULSE DOMAIN TO SYNCHRONOUS DIGITAL DOMAIN CONVERTER

STATEMENT REGARDING FEDERALLY SPONSORED RESEARCH OR DEVELOPMENT

This invention was made under US Government contract no. N00014-09-C-0234 and therefore the US Government may have certain rights in and to this invention.

CROSS REFERENCE TO RELATED PATENT AND PATENT APPLICATIONS

This application is related to the technology disclosed in U.S. Pat. No. 7,515,084 issued Apr. 7, 2009 and entitled "Analog to Digital Converter Using Asynchronous Pulse Technology", the disclosure of which is hereby incorporated herein by reference.

This application is also related to the technology disclosed in U.S. Pat. No. 9,154,172 issued Oct. 6, 2015 and entitled "Time Encoded Circuits and Methods and a Time Encoder Based Beamformer for Use in Receiving and Transmitting Applications", the disclosure of which is hereby incorporated herein by reference.

This application is also related to the technology disclosed in U.S. patent application Ser. No. 14/834,837 filed Aug. 25, 2015 and entitled "Dual Edge Pulse De-multiplexer with Equalized Path Delay" the disclosure of which is hereby incorporated herein by reference.

TECHNICAL FIELD

This invention relates to a pulse domain to digital domain converter which accepts asynchronous pulse domain signals and converts them to the synchronous digital domain.

BACKGROUND

The pulse domain (also known as the time domain) is becoming a more and more desirable domain for information encoding and/or transfer. In the analog domain signals are typically represented by both their amplitudes and shapes. In the digital domain, signals represent binary numbers and the intervals between the 1's and 0's of the digital information is typically regulated by a clock in the digital domain so such signals in the digital domain are synchronous with the clock. The digital domain has both advantages and disadvantages compared to the analog domain. The digital domain is resistant to amplitude excursions which hamper the analog domain, but a digital domain signal is typically just an approximation of a corresponding analog signal. Information can be lost when an analog signal is digitized.

In contrast, in the pulse domain information (data) is encoded by pulses and it is the interval between successive pulses (and not their amplitudes) which encodes the information (data) being conveyed by a pulse domain signal. So a pulse domain signal has certain advantages over signals in either the digital or analog domains.

However, there are instances when it is advantageous to transfer information from the pulse (or time) domain to the digital domain. See, for example, U.S. Pat. No. 9,154,172 issued Oct. 6, 2015. The present invention relates a Asynchronous-to-Synchronous Time-to-Digital Converter which facilitates such a transfer of information.

The prior art includes: X. Kong et al., "A Time-Encoding Machine Based High-Speed Analog-to-Digital Converter", IEEE Journal on Emerging and Selected Topics in Circuits and Systems, Vol. 2, No. 3, September 2012. See also FIG. 1. This prior art circuit utilizes a de-multiplexer (DeMUX), multiple pulse-to-voltage (P2V) converters, and multiple analog-to-digital converters (ADC). This circuit has the disadvantages of (i) a large implementation area and high power consumption due to this large number of the building blocks, and (ii) a proneness to process, voltage and temperature (PVT) variations of the contemporary semiconductor technology since the building blocks of P2V and ADC have to be implemented in analog circuits.

Asynchronous-to-synchronous converters which operate in solely in the digital domain are known, which prior art also includes: R. Sharma et al., "Asynchronous-to-Synchronous Converter", U.S. Pat. No. 5,268,934, Dec. 7, 1993; R. Tyrrel, "Asynchronous-to-Synchronous Data Interface", U.S. Pat. No. 4,586,189, Apr. 29, 1986; and G. Offord, "Low-Power Area-Efficient and Robust Asynchronous-to-Synchronous Interface", U.S. Pat. No. 5,522,048, May 28, 1996. See also FIGS. 2-4 from these patents. This prior art relates to asynchronous-to-synchronous converters. The prior art shown in FIGS. 2 and 3 is mainly targeting at data transfer over a RS-232 communication channel, so both require the start and stop bits for the conversion process, which involves a significant communication overhead due to these extra bits. The prior art represented by FIG. 4 aims for an interface between a master chip and a target chip. However, it cannot guarantee not to generate duplicated data at the system/application level. Consequently, this prior art has a disadvantage of high risk of generating system/application malfunctions that are related to data duplications.

More importantly, the prior art represented by FIGS. 2-4 is not capable of converting information (date) from the pulse domain to the digital domain.

BRIEF DESCRIPTION OF THE INVENTION

In one aspect the present invention provides an asynchronous pulse domain to synchronous digital domain converter for converting pulse domain signals in an input asynchronous pulse domain data stream to synchronous digital domain signals in a data output stream, the converter comprising a plurality of counters arranged in a ring configuration with only one counter in said ring being responsive at any given time to positive (which may be leading edges of a pulse) and negative going pulses in the pulse domain signals, each counter, when so responsive, counting a number of time units between either (i) a positive going pulse and an immediately following negative going pulse or (ii) a negative going pulse and an immediately following positive going pulse, the counts of the counters when so responsive being synchronously converted to said synchronous digital domain signals in the data output stream.

In another aspect, the present invention provides an asynchronous pulse domain to synchronous digital domain converter for converting pulse domain signals in an input asynchronous pulse domain data stream to synchronous digital domain signals in a data output stream, the converter comprising a plurality of counters arranged in a ring configuration with only one counter in said ring being responsive at any given time to positive and negative going pulses in said pulse domain signals, each counter when so responsive counting a number of instances of a measurement unit interval between either (i) a positive going pulse and an immediately following negative going pulse or (ii) a negative going pulse and an immediately following positive going pulse, the counts of the counters when so responsive being synchronously converted to said synchronous digital domain signals in said data output stream. Preferably, the measurement unit interval is preferably equal to a time delay from an input to an output of a buffer cell used in the converter.

In yet another aspect, the present invention provides an asynchronous pulse domain to synchronous digital domain converter for converting pulse domain signals in a input data stream to synchronous digital domain signals, the converter comprising: (a) at least one pair of counters, a first counter of said at least one pair of counters starting to count in response to a positive going pulse in said input data stream and stopping its count in response to a negative going pulse in said input data stream following the positive going pulse in said input data stream and a second counter of said at least one pair of counters starting to count in response to said negative going pulse in said input data stream and stopping its count in response to a positive going pulse in said input data stream following the negative going pulse in said input data stream, the count counted by said first counter between a positive going pulse and a following negative going pulse in said input data stream being provided as asynchronous parallel data on a bus of said first counter and the count counted by said second counter between a negative going pulse and a following positive going pulse in said input data stream being provided as asynchronous parallel data on a bus of said second counter; (b) at least one pair of parallel asynchronous to synchronous interfaces, a first parallel asynchronous to synchronous interface of said at least one pair of parallel asynchronous to synchronous interfaces receiving the asynchronous parallel data from the first counter of said at least one pair of counters for synchronizing the asynchronous parallel data received therefrom with a first clock signal, a second parallel asynchronous to synchronous interface of said at least one pair of parallel asynchronous to synchronous interfaces receiving the asynchronous parallel data from the second counter of said at least one pair of counters for synchronizing the asynchronous parallel data received therefrom with a second clock signal; and (c) a multiplexer arrangement for multiplexing the synchronized parallel data from the at least one pair of parallel asynchronous to synchronous interfaces onto an output bus.

In still yet another aspect, the present invention provides a method of converting a stream of asynchronous pulse domain signals into a stream of synchronous digital domain signals, the method comprising: separating pulse domain signals in the stream of asynchronous pulse domain signals into first and second pulse data streams using an inverter, so that the second pulse data stream is an inverse of the first pulse data stream; applying both the first and second streams to pairs of counters and arranging said pairs of counters in a ring configuration thereof, so that a first counter of each pair starts counting, when enabled, in response to a data transition in the first stream and stops counting in response to an immediately following data transition in the second stream while a second counter of each pair starts counting, when enabled, in response to a data transition in the second stream and stops counting in response to an immediately following data transition in the second stream, the counters being sequentially and individually enabled for counting one at a time; outputting the counts made by said counters as digital data; and synchronizing the digital data data and outputting the synchronized digital data as said synchronous digital domain signals.

BRIEF DESCRIPTION OF THE DRAWINGS

FIG. 5(c) shows an exemplary pulse train which may be applied to the input of the disclosed Asynchronous Pulse Domain to Synchronous Digital Domain Converter.

DETAILED DESCRIPTION

Figure 5A:
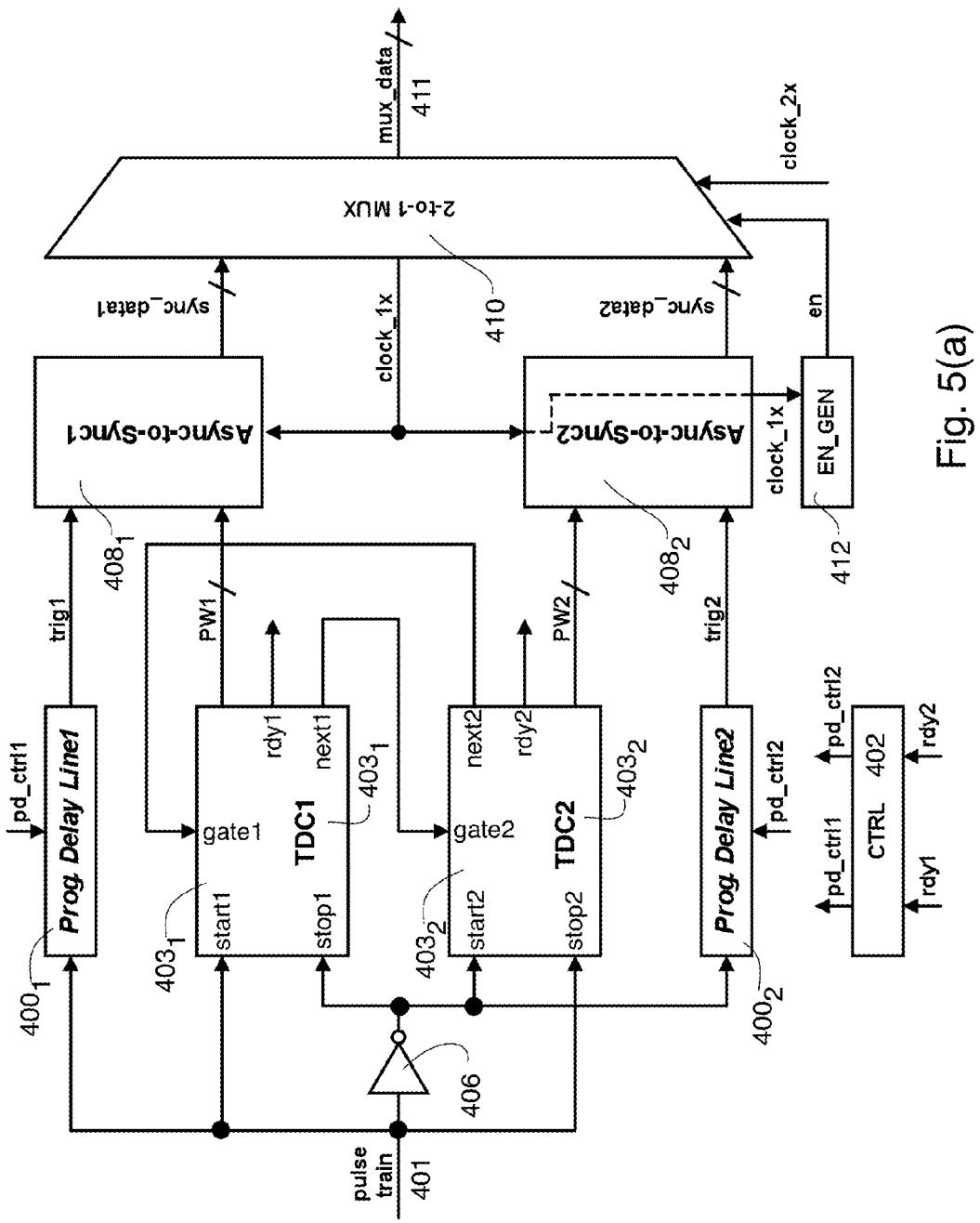
FIG. 5(a) depicts the basic structure of an embodiment of an Asynchronous Pulse Domain to Synchronous Digital Domain Converter in accordance with the present invention.

FIG. 5(a) shows the basic structure of an embodiment of an Asynchronous Pulse Domain to Synchronous Digital Domain Converter in accordance with the present invention. The same reference numerals and signal names and nomenclature are used throughout the various drawing figures and related descriptions for consistency's sake.

The embodiment of FIG. 5(a) utilizes two time-to-digital converters TDC1 and TDC2 ($403_1$ and $403_2$), two programmable delay lines ($400_1$ and $400_2$), two asynchronous-to-synchronous interfaces Async-to-Sync1 and Async-to-Sync2 ($408_1$ and $408_2$), one 2-to-1 multiplexer or MUX (410), one enable generator (412), and one controller 402. The two time-to-digital converters ($403_1$ and $403_2$) are described in greater detail with reference to FIGS. 5(b), 5(c) and 5(e) while the two asynchronous-to-synchronous interfaces (Async-to-Sync1 ($408_1$) and Async-to-Sync2 ($408_2$)) are described in greater detail with reference to FIGS. 6(a) through 6(h). A state diagram for the controller 402 (CTRL 402) is described in greater detail with reference to FIGS. 5(g) and 5(g1) while the Enable Generator (EN_GEN 412) is described in greater detail with reference to FIG. 5(h). The two programmable delay lines ($400_1$ and $400_2$) are described in greater detail with reference to FIG. 5(i). Each of the two asynchronous-to-synchronous interfaces (Async-to-Sync1 ($408_1$) and Async-to-Sync2 ($408_2$)) is responsive to a delayed version of pulse train 401. Async-to-Sync1 ($408_1$) is responsive to trig1, which is a delayed version of pulse train 410 while Async-to-Sync2 ($408_2$) is responsive to trig2, which is a delayed and inverted version of pulse train 410. A common clock (clock_1x) preferably serves as this periodic clock for these two asynchronous-to-synchronous interfaces (Async-to-Sync1 ($408_1$) and Async-to-Sync2 ($408_2$)). Therefore, the outputs of these two Async-to-Sync are preferably synchronized to the same periodic clock, namely, clock_1x. A more generic version of the structure of an embodiment of an Asynchronous Pulse Domain to Synchronous Digital Domain Converter in accordance with the present invention is described below with reference to FIG. 5(d).

Figure 5B:
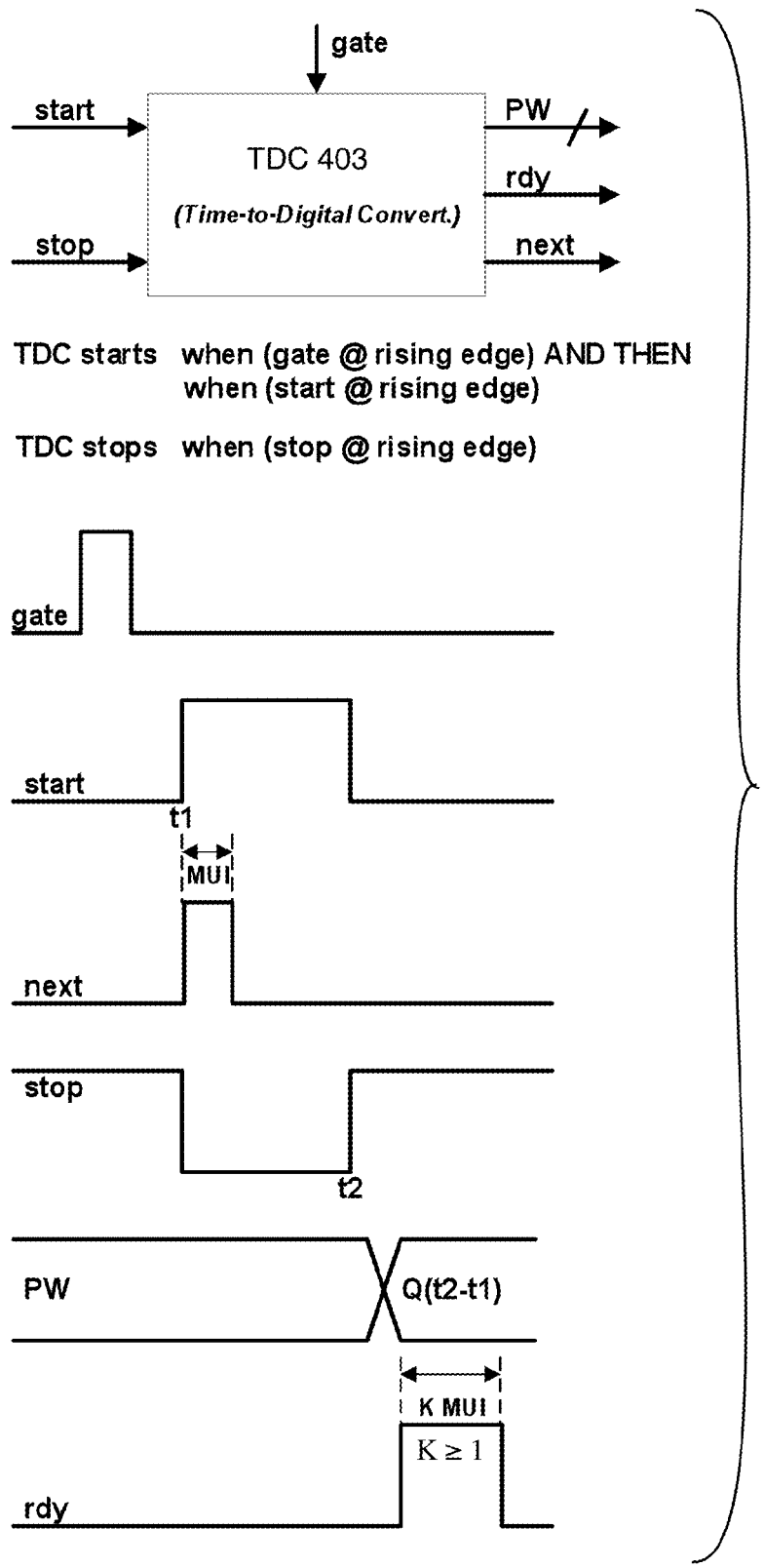
FIG. 5(b) shows the input and output (I/O) ports of each of the time to digital converters (TDC) used in the embodiment in FIG. 5(a).

FIG. 5(b) shows the input and output (I/O) ports of each of the time to digital converters (TDC) $403_1$ and $403_2$ used in the embodiment in FIG. 5(a), and a timing diagram of signals at these I/O ports. FIG. 5(f) shows one possible circuit implementation of a TDC 403. Each TDC 403 has three input ports: start, stop and gate, and two output ports: next and rdy, and has one output bus PW, on which the quantized value of the pulse interval measurement can be accessed. In FIG. 5(f) the time difference between the input and output of a buffer cell (BUF) is regarded as one measurement unit interval (MUI) and the number of bits in the output bus PW is M bits wide and this bus identified as PW[0], PW[1], PW[2], ... PW[M−2], PW[M−1] in FIG. 5(f). Each TDC 403 starts counting time (in MUI units) when its gate pin is driven by a rising-edge signal from low level (logic 0) to high level (logic 1), and then following this trigger employed on the gate input, its start input is driven by a rising-signal from low level (logic 0) to high level (logic 1). Once the TDC 403 starts counting time, it will not stop until its stop input is driven by a rising-edge signal from low level (logic 0) to high level (logic 1). Moreover, the signal on the next pin (see the pin labeled 'next' on the right side of the TDC block 403 shown in FIG. 5(b)) asserts to high level (logic 1) after the TDC 403 starts counting, and this assertion lasts for one MUI. In addition, the counting value, which is an integer multiple of MUI, will be ready on the output bus PW after the TDC 403 stops counting. As for the rdy output, it asserts to high level (logic 1) when the counting value is ready on PW, and this assertion remains for K MUIs where K≥1. K is a positive integer. The value of K depends on the setup time of CTRL (block 402 in FIG. 5(a)).

The time unit noted above is called a MUI. As noted above, a MUI is preferably equal to the time delay from the input (I) to the output (O) of a buffer cell (BUF). The BUF does not change the logic value of its input; it just delays the input by a MUI. It can be seen from FIG. 5(a) and FIG. 5(d) that the clock_1x provides the synchronous/periodical clock to the asynchronous-to-synchronous interfaces ($408_1$, $408_2$, $408_3$, ... $408_{2N}$), which aim to convert the asynchronous data streams into the synchronous ones without losing any data. Therefore, the speed of the clock_1x is preferably set higher (for example, 1.5 times higher) than the (average) rate of positive/negative pulse. Since MUI is the minimum pulse-width measurement unit, the positive/negative pulse-width of the asynchronous pulse train should preferably be equal or greater than one MUI. Given that the positive and negative pulses appear alternatively, the maximum rate of positive/negative pulse is $1/(2 \times MUI)$. Therefore, the speed of clock_1x can preferably be set to $>(1/(2 \times MUI))$ for converting the asynchronous data streams into the synchronous ones without losing any data. For example, the speed of clock_1x is preferably set to equal $1.5/(2 \times MUI)$.

As noted above, FIG. 5(f) shows one possible exemplary implementation or embodiment of the TDC 403. This exemplary embodiment consists of flip-flops (DFF0, DFF1, ..., DFF(M−1), DFF0', DFF1' ..., DFF(M−1)', DFF(2M), and DFF(3M)), buffers (BUF0, BUF1, ..., BUF(M−1), BUF (2M), BUF(2M+1), BUF(3M), BUF(3M+1), ..., BUF(3M+ K), BUF(4M), ..., BUF(4M+1)), 2-to-1 switches/multiplexers (SW0, SW1, ..., SW(M−1), SW(2M), and SW(3M)), inverters (INV0, INV1, ..., and INV4), 2-input AND gates (AND0, AND1, AND2, and AND3), one 2-input OR gate (OR0) and two 2-input NAND gates (NAND0 and NAND1)), two 3-input NAND gates (NAND30 and NAND31), and two 2-input NOR gates (NOR0 and NOR1). These two 2-input NOR gates (NOR0 and NOR1) exist only in the even-number TDC (see TDC2 in FIG. 5(a), or TDC2, TDC4, ... and TDC(2N) in FIG. 5(d)). These two 2-input NOR gates (NOR0 and NOR1) are used to ensure the high-level (logic 1) to low-level (logic 0) transition at the start pin of the even-number TDC (see TDC2 in FIG. 5(a), or TDC2, TDC4, ... and TDC(2N) in FIG. 5(d)) to be captured properly. The reset inputs of each of the flip-flops are connected to the power-on-reset (POR) signal, which transits from low level (logic 0) to high level (logic 1) when the power of the circuit implementation is turned on. The switches SW0, SW1, ..., SW(M−1) are controlled by a sel signal. When the sel signal is at high level (logic 1), the incoming signal at the start pin passes through the buffers BUF0, BUF1, ..., and BUF(M−1). Each output pin (O) of these buffers connects to the data input pins (D) of the flip-flops DFF0, DFF1, ..., DFF(M−1), respectively. Furthermore, the clock pins of these flip-flops are driven by the stop pin if these flip-flops occur in an odd-numbered TDC (see, for example, TDC1 in FIG. 5(a), or TDC1, TDC3, ... and TDC(2N−1) in FIG. 5(d)), otherwise they are driven by the output C of the 2-input NOR gate NOR1 if these flip-flops occur in an even-numbered TDC (see, for example, TDC2 in FIG. 5(a), or TDC2, TDC4, ... and TDC(2N) in FIG. 5(d)). Therefore, the 1-MUI, 2-MUI, ..., M-MUI delayed replicates of the signal at start pin will be latched at the output pins (Q) of the flip-flops DFF0, DFF1, ..., and DFF(M−1), respectively when the signal at stop pin is driven from low level (logic 0) to high level (logic 1) (and the sel signal is at high level). Given the pulse train shown in FIG. 5(c), the pulse width (t2-t1) can be measured and quantized in terms of the MUI unit by the above-mentioned circuit arrangements and connections since the signal at stop pin is the inverted version of the signal at start pin (as shown in FIG. 5(a)). In addition, the signal at stop pin of the odd-numbered TDCs (see TDC1 in FIG. 5(a), or TDC1, TDC3, . . . and TDC(2N−1) in FIG. 5(d)) passes through a series of buffers: BUF(3M), BUF (3M+1), . . . , BUF(3M+K), and one inverter (INV3), while, on the other hand, the signal at stop pin of the even-numbered TDCs (see TDC2 in FIG. 5(a), or TDC2, TDC4, . . . and TDC(2N) in FIG. 5(d)) passes through the two 2-input NOR gates: NOR1 and NOR2 first and then the aforementioned buffers and inverter (BUF(3M), BUF(3M+1), . . . , BUF(3M+K), and INV3). AND2 takes the output (O) of BUF(3M) and the output (B) of INV3 to generate a positive pulse having a width preferably equal to K times MUI (see the signal 'rdy' at the bottom of FIG. 5(b)) when the signal at stop pin transits from low level (logic 0) to high level (logic 1). Moreover, the outputs (Q) of the flip-flops DFF0, DFF1, . . . , and DFF(M−1) are latched again by the flip-flops DFF0', DFF1', . . . , and DFF(M−1)' after the pw_clk signal is driven from low level (logic 0) to high level (logic 1). The outputs (Q) of DFF0', DFF1', . . . , and DFF(M−1)' serve as the output data bus (PW).

The sel and pw_clk signals are generated by the circuitry shown in the lower-left portion of FIG. 5(f). This circuitry includes one 2-to-1 switch/multiplexer (SW(2M)), two buffers (BUF(2M) and BUF(2M+1)), three inverters (INV0, INV1, and INV2), two 2-input AND gates (AND0 and AND1), one 2-input OR gate (OR0), and one flip-flop (DFF(2M)). After POR, the output (Q) of flip-flop DFF(2M) is at low level (logic 0), and therefore the sel signal is at low level (logic 0), which prevents the signal at start pin or input from passing through. This prevention further makes the input A of the OR gate OR0 at low level (logic 0). Upon the signal at gate pin or input driving from a low level (logic 0) to a high level (logic 1), the output C of OR gate OR0 transits from low level (logic 0) to high level (logic 1). This transition makes the flip-flop DFF(2M) flip because of the inverted feedback from the output Q to the input D of DFF(2M) through INV2. This flipping of flip-flop DFF(2M) makes the sel signal at high level (logic 1), which lets the signal at start pin pass through the switches SW0 and SW(2M), and the various delay replicas of this signal pass through the switches SW1, SW2, . . . , and SW(M−1), respectively. The buffer BUF(2M), inverter INV0, and AND gate AND0 generate a positive pulse when the passing-though signal from start pin or input transits from a high level (logic 1) to a low level (logic 0). The low-level (logic 0) to high-level (logic 1) transition of this positive pulse makes the output C of OR gate OR0 transit from low level (logic 0) to high level (logic 1) since at this moment the input B of OR gate OR0, which is driven by the next pin or input of another TDC 403, is at low level (logic 0). This transition at the output C of OR gate OR0 makes the flip-flop DFF (2M) flip again. This flipping sets the sel signal to low level (logic 0), which again prevents the signal at start pin or input from passing through. Moreover, this flipping makes the pw_clk signal transit from low level (logic 0) to high level (logic 1). This transition makes a quantized pulse width measurement available on the output bus PW. When the signal at start pin or input is allowed to pass through, the rising edge from low level (logic 0) to high level (logic 1) will be detected by buffer BUF(2M), inverter INV1 and AND gate AND1. This detection generates a 1-MUI positive pulse at the output C of the 2-input AND gate AND1. This 1-MUI positive pulse passes through the two 3-input NAND gates (NAND30 and NAND31), and arrives at the next pin or output. In addition, the signal generation at the next pin or output of the last TDC (TDC2 (block $403_2$) in FIG. 5(a), or TDC(2N) (block $403_{2N}$) in FIG. 5(d)) needs the extra circuitry or logic 420 that is shown in the box at the lower-right portion of FIG. 5(f). This extra logic 420 generates a positive pulse at next pin or output after POR since the gate pin of the $1^{st}$ TDC (TDC1 in FIG. 5(a) and FIG. 5(d)) connects to the next pin or output of the last TDC. Without this (initial) positive pulse, the signal at start pin or input of TDC1 never passes through, and therefore no positive pulse is generated at next pin by TDC1. This absence of positive pulse at next pin prevents the signal at start pin or output passing through the next TDC (TDC2 in FIG. 5(a) and FIG. 5(d)). This prevention propagates from the $1^{st}$ TDC to the last TDC and back to the $1^{st}$ TDC, and disables the operation of the converter shown in FIG. 5(a) and FIG. 5(d). The extra circuitry 420 exists only in the last TDC 403 (see TDC2 (block $403_2$) in the embodiment of FIG. 5(a), or TDC(2N) block $403_{2N}$ in the embodiment of FIGS. 5(d) and 5(f)) and utilizes of two buffers (BUF(4M) and BUF(4M+1)), one inverter (INV4), one 2-input ADC gate (AND3), one filp-flop (DFF(3M)), and one 2-to-1 switch/multiplexer (SW(3M)). The BUF(4M), BUF(4M+1), INV4, and AND3 will generate a 1-MUI positive pulse when the POR signal is driven from low level (logic 0) to high level (logic 1). In addition, this POR transition makes the output Q of DFF(3M) at low level (logic 0), which lets the 1-MUI positive pulse generated at output C of AND3 pass through SW3 to serve as the signal at next pin or output. When the 1-MUI positive pulse generated by a preceding TDC 403 (TDC1 in FIG. 5(a), or TDC(2N−1) in FIG. 5d)) arrives at the gate pin or input, the low-level (logic 0) to high-level (logic 1) transition of this positive pulse makes the output Q of flip-flop DFF(3M) latches the high level (logic 1) signal applied on the input D of flip-flop DFF(3M). The latched high level (logic 1) signal makes SW(3M) select the signal generated by AND gate AND1 as the signal at next pin or output so the signal generation at next pin or output becomes the same as other TDCs.

The sel signal flips between low a logic level (logic 0) and a high logic level (logic 1) (i.e. 0→1→0→1→0 . . . ). This flipping occurs after each falling edge of the start signal at the start pin or input. As mentioned above, for a pulse train with alternative positive and negative pulses (applied on the signal start), the maximum rate of positive/negative pulse is 1/(2×MUI); this is also the maximum rate for the occurrence of falling edge. Therefore, the sel signal can flip at a maximum rate of 1/(2×MUI). So the speed of the clock_1x should preferably be set >maximum flipping rate of the signal sel.

Figure 5D:
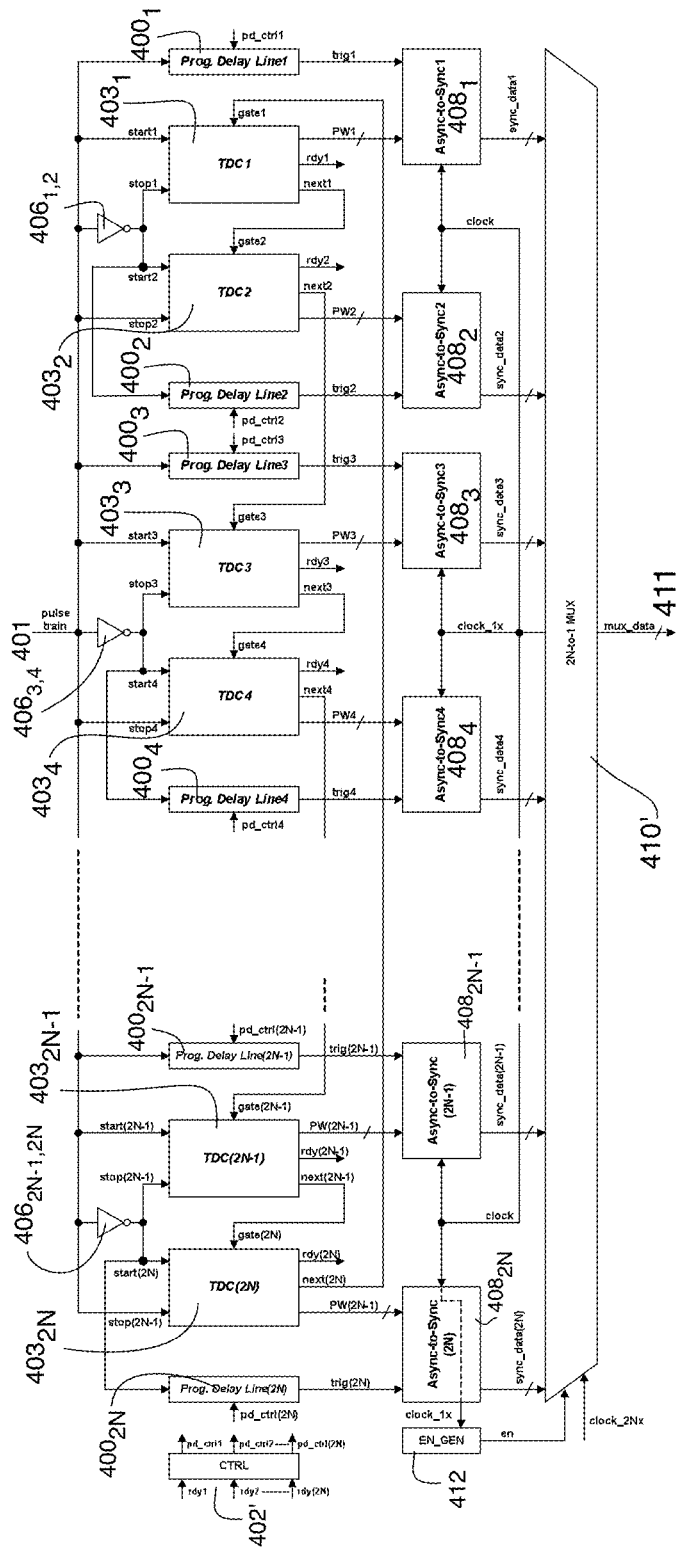
FIG. 5(d) is a more generic embodiment of the Asynchronous Pulse Domain to Synchronous Digital Domain Converter depicted by FIG. 5(a).

So the embodiment of a TDC 403 shown by FIG. 5(f) has a box 420 which is labeled "ONLY exists in LAST TDC (TDC(2N))" since, as explained above, only the last TDC need have this circuitry (for the embodiment of a TDC depicted by FIG. 5(f) as other embodiments of a TDC are certainly possible). There are only two TDCs ($403_1$ and $403_2$) shown on FIG. 5(a), so for the embodiment of FIG. 5(a) N equals 1 and thus TDC $403_2$ is then the "LAST TDC" for that embodiment of an Asynchronous Pulse Domain to Synchronous Digital Domain Converter in accordance with that embodiment of the present invention. But as can be seen from the embodiment of FIG. 5(d), more than two TDCs 403 may be utilized and hence N may be equal to more than 1. In addition, the embodiment of a TDC 403 shown by FIG. 5(f) has a box 421 which is labeled "ONLY exists in even-number TDC(s): TDC2, TDC4, . . . and TDC(2N)"

since, as previously explained, in FIG. 5(a), only TDC2 should have this circuitry, and in FIG. 5(d) only TDC2, TDC4, . . . and TDC(2N) should have this circuitry.

As is noted above, POR stands for Power-on-Reset. The POR signal is generated at blocks 500 of FIGS. 5(e) and 5(g1).

Figure 5E:
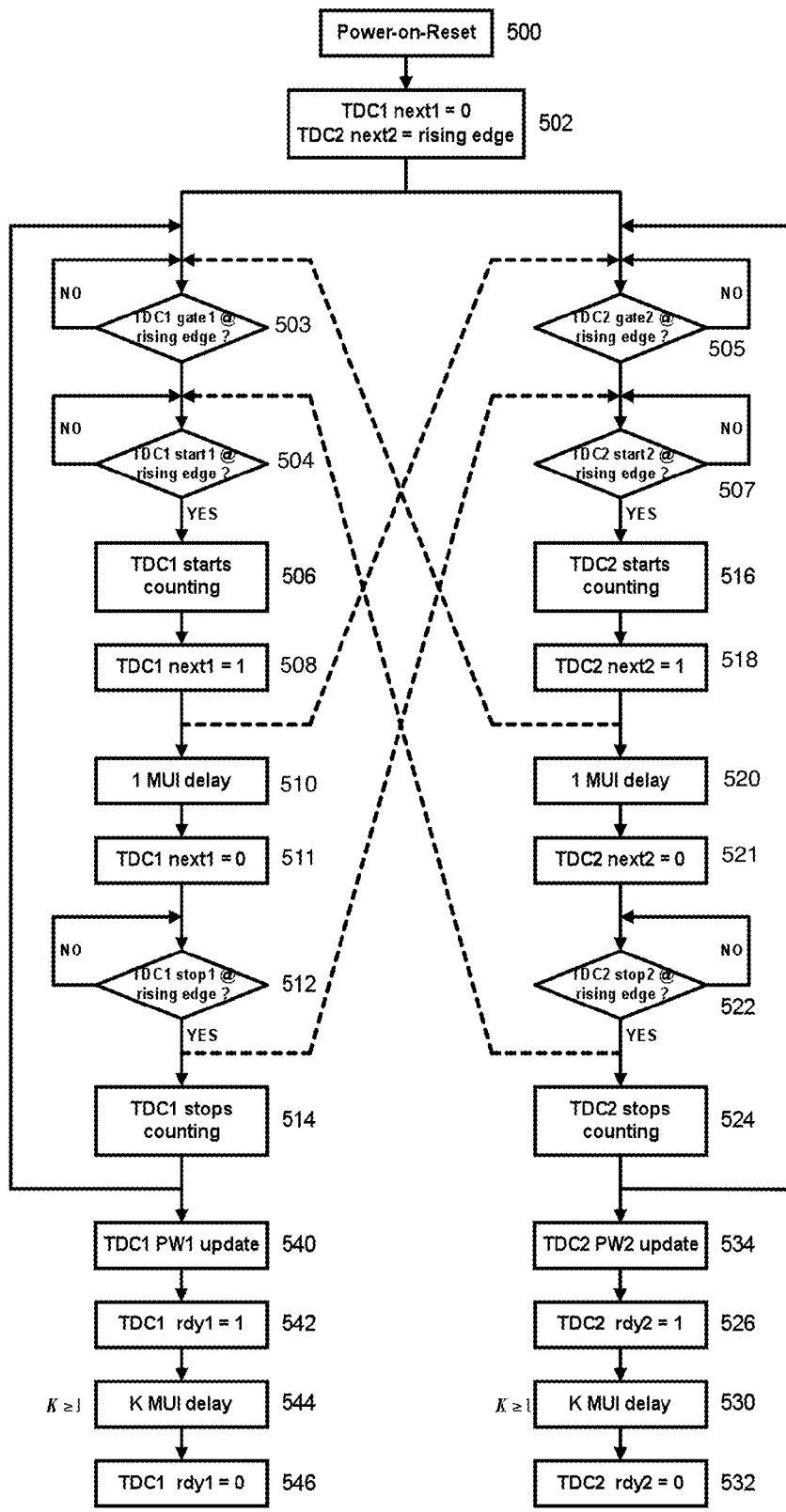
FIG. 5(e) is a flow chart and the method of generating the quantized measurements for the positive and negative pulse intervals is described with reference to this flow chart.
Figure 5F:
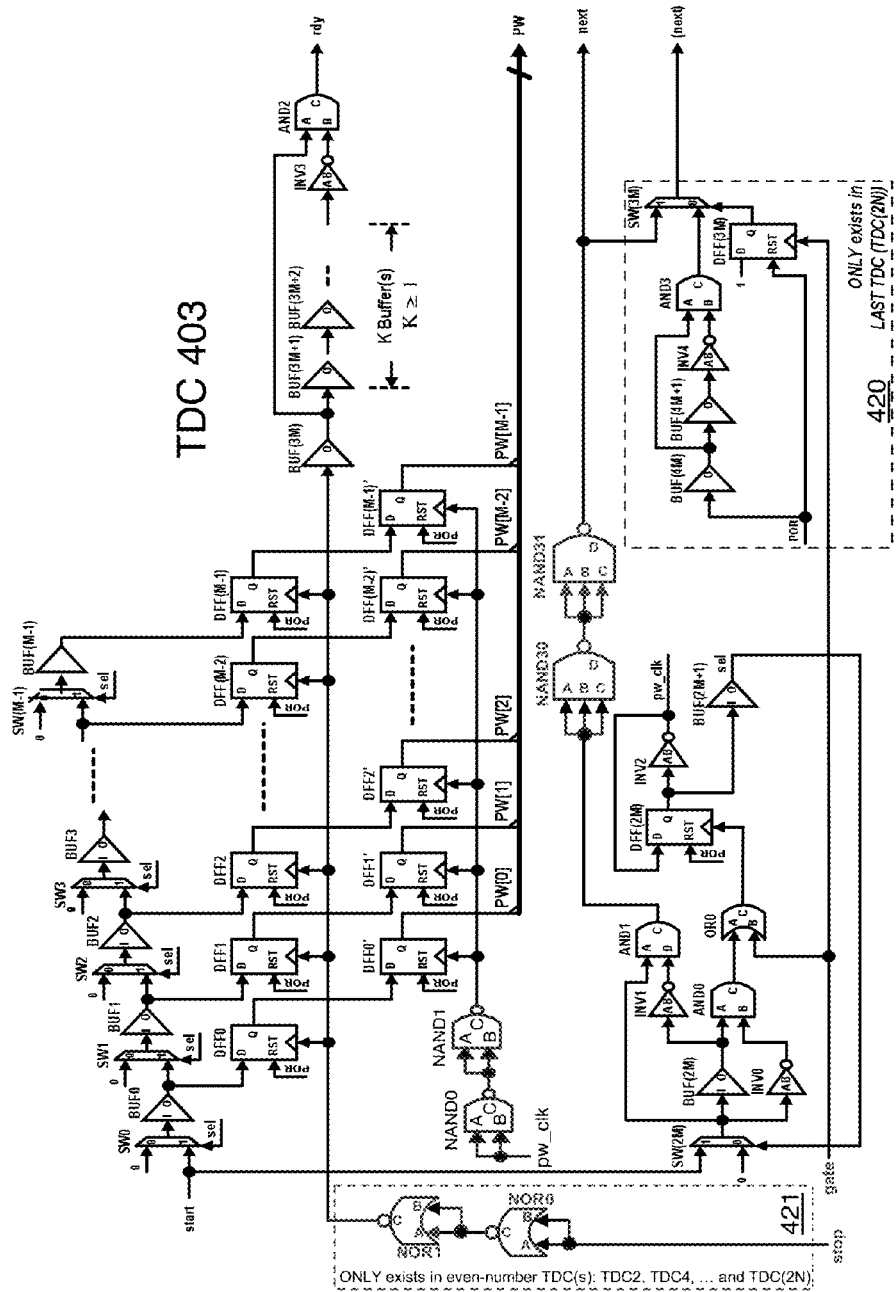
FIG. 5(f) shows one possible circuit implementation of the time-to-digital converters (TDC1 and TDC2) depicted on FIG. 5(a).
Figure 5G:
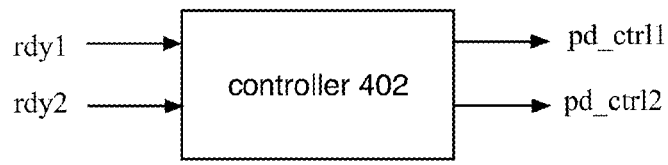
FIGS. 5(g) and 5(g1) depict the CTRL 402 shown on FIG. 5(a) and the state diagram (control flow) of the controller.
Figure 5:
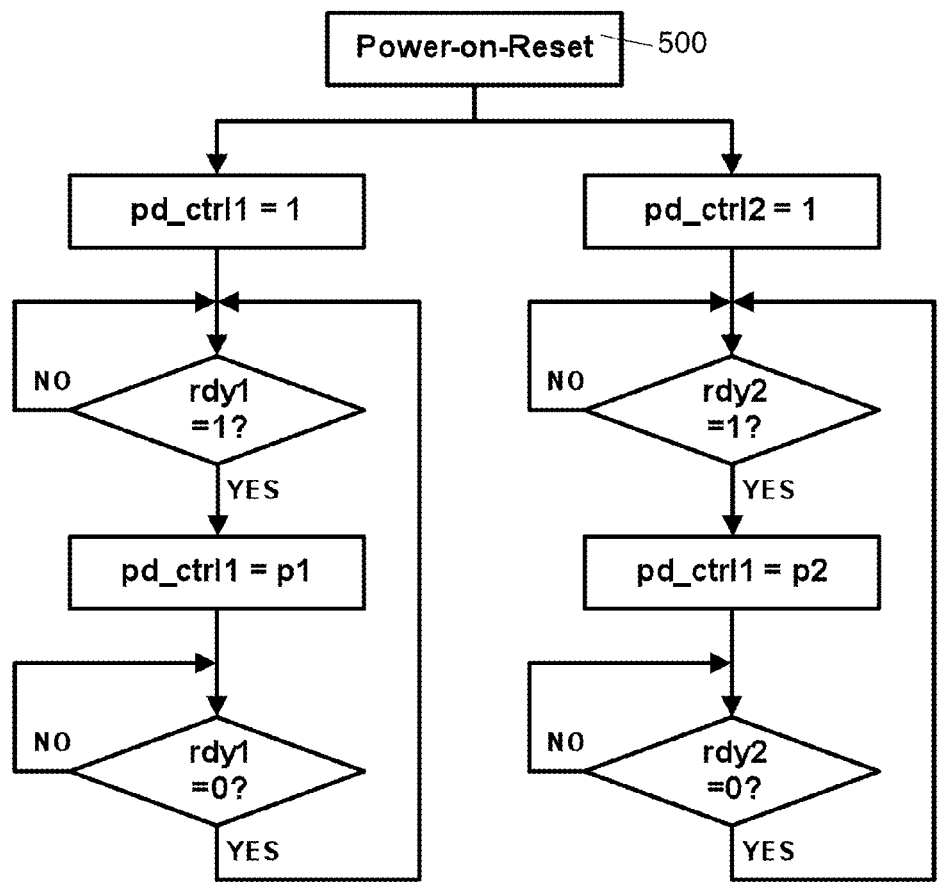

Turning again to FIG. 5(a), the input pulse train 401 (in the pulse domain) enters the programmable delay lines 1 and 2 ($400_1$ and $400_2$) as well as the start1 input of TDC1 and stop2 input of TDC2. In addition, the input pulse train 401 is inverted by an inverter 406 whose output is connected to the stop1 input of TDC1 and the start2 input of TDC2. TDC1 and TDC2 are cross coupled: the next output (next1) of TDC1 is connected to the gate input (gate2) of TDC2, and the next output (next2) of TDC2 is connected to the gate input (gate1) of TDC1. The rdy outputs (rdy1 and rdy2) of TDC1 and TDC2 are connected to the controller (CTRL 402), which generates control signals, pd_ctrl1 and pd_ctrl2, to control the programmable delay lines 1 and 2 ($400_1$ and $400_2$), respectively. The controller CTRL 402 can be realized through a state-machine hardware or a commercially available microprocessor/microcontroller. The controller CTRL 402 takes 'rdy1' and 'rdy2' as inputs and follows a state diagram (control flow) to generates 'pd_ctrl1' and 'pd_ctrl2' outputs. The state diagram (control flow) of the controller CTRL 402 is shown by FIG. 5(g1). After a power-on-reset (POR), the outputs 'pd_ctrl1' and 'pd_ctrl2' of controller 402 are both set the value 1. The controller 402 sets the output 'pd_ctrl1' ('pd_ctrl2') to the value 'p1' ('p2') when the input 'rdy1' ('rdy2') asserts. The value 'p1' ('p2') is preferably programmable and is preferably set by the user of the technology disclosed herein.

Figure 5H:
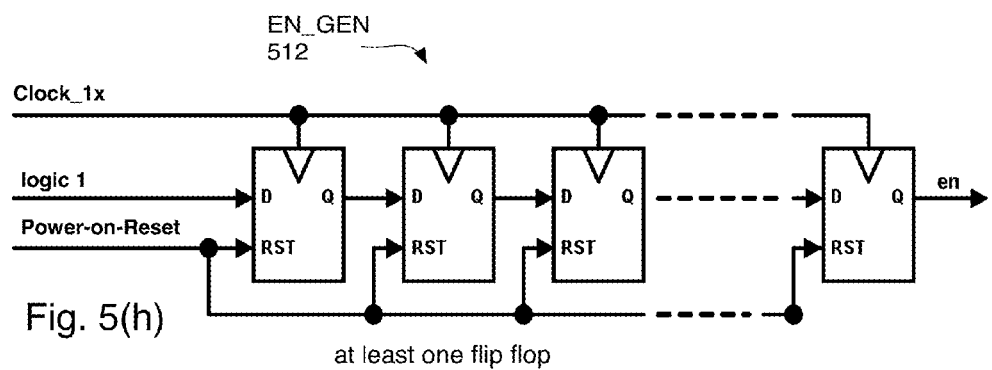
FIG. 5(h) shows one possible circuit implementation of the Enable Generator (EN_GEN 402) depicted on FIG. 5(a).

The output trig1 of programmable delay line 1 ($400_1$) and the multi-bit output bus PW1 of TDC1 connect to the asynchronous-to-synchronous interface 1 ($408_1$). Similarly, output trig2 of programmable delay line 1 ($400_2$) and the multi-bit output bus PW2 of TDC2 connect to asynchronous-to-synchronous interface 2 ($408_2$). A periodic clock signal (clock_1x) generated by the 2-to-1 MUX 410, feds into these two asynchronous-to-synchronous interfaces $408_1$ and $408_2$ and the enable generator 412, which is shown in greater detail by FIG. 5(h). MUX 410 preferably comprises a conventional 2-to-1 multiplexer, and a clock divider (divide-by-2) to generate the clock_1x from the clock_2x clock. The output buses (sync_data1 and sync_data2) of asynchronous-to-synchronous interfaces $408_1$ and $408_2$ connect to the 2-to-1 multiplexer MUX 410, which is controlled by the output (en) of EN_GEN 412, and driven by a periodic clock signal (clock_2x), the clock frequency of which is preferably twice of that of clock_1x. The enable generator EN_GEN 412 preferably includes of a number of flip-flops as is shown by FIG. 5(h). The number of flip-flips is at least one. The larger the number of flip-flops, the longer the output latency MUX 410. The flip-flops are connected in series if there are more than one flip-flop. Each flip flop is preferably identical, and has a data input (D), a data output (Q) as well as a reset input (RST). When the RST asserts, the output Q is set to zero. The input D of the first (left-most) flip flop is set to a logic 1 state.

Figure 5I:
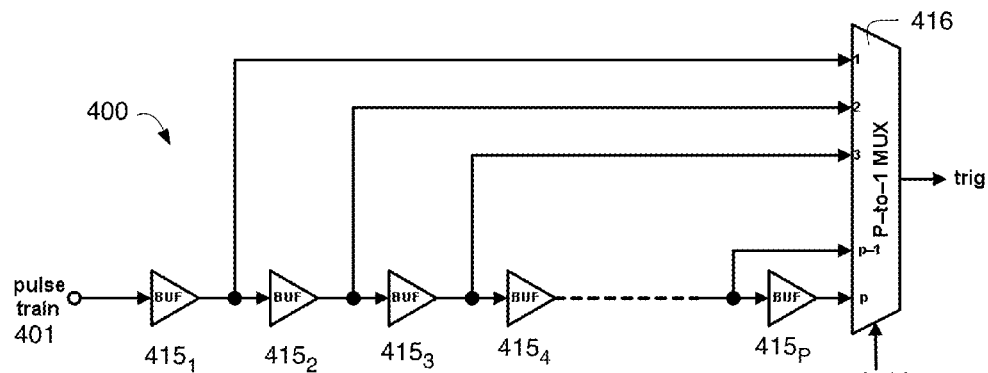
FIG. 5(i) depicts an exemplary programmable delay line.

Turning once more to FIG. 5(a), FIG. 5(a) includes two programmable or adjustable delay lines ($400_1$ and $400_2$) and an exemplary programmable or adjustable delay line 400 for the two programmable or adjustable delay lines ($400_1$ and $400_2$) is depicted by FIG. 5(i). The exemplary programmable or adjustable delay line 400 has of a number of buffer cells BUF $415_1$ . . . $415_P$ that are connected in series, and a multiplexer (P-to-1 MUX) 416 that takes the output of each buffer cell $415_1$ . . . $415_P$ as one of its inputs. Based on the value of the input 'pd_ctrl' from controller CTRL 402, a selected one of the outputs of the buffer cells BUF $415_1$ . . . $415_P$ passes through the multiplexer 416, and serves as the output 'trig' of the programmable delay line 400 of FIG. 5(i). The delay imposed by one of the programmable delay lines 400 is determined by the required setup time of the asynchronous-to-synchronous interfaces ($408_{1,2}$) thereby determining the value of the number P of buffers cells BUF $415_1$ . . . $415_P$ utilized in the series chain of them shown in FIG. 5(i). Preferably the two programmable or adjustable delay lines ($400_1$ and $400_2$) are each preferably implemented as shown by the exemplary programmable or adjustable delay line 400 of FIG. 5(a). These delay lines have an adjustable delay controlled by the number P of buffer cells BUF $415_1$ . . . $415_P$. The number P is set to a value greater or equal to one. As shown in FIG. 6(b), the 'PW' and 'trig' signals enter FIFO1. Therefore, the required setup time is determined by FIFO1, which can be implemented through registers (e.g. using flip-flops DFF) or memories (e.g. SRAM).

The value of 'P' is preferably established (fixed) after the values of 'N' and 'M' are established. For example, say 'N' is set equal to 2, and 'M' is set equal to 10, then 'P' may be set to 8, for example. This would mean in FIG. 5(i), there are 8 BUFs ($415_1$ to $415_8$), and one 8-to-1 MUX 416. The (adjustable) delay lines ($400_1$ and $400_2$) are delay lines, and their delay values can be set by users. For the just-mentioned example, users can select eight different delay values, ranging from 1 to 8 MUIs.

In the embodiment of FIG. 5(f), the TDC 403 has M flip-flops (DFF0, DFF1, . . . DFF(M−1)) that process the input 'start' signal at the start pin or input, so these M DFFs can measure an input pulse width (acting as a thermometer code counter) up to M in the pulse train 401. Also, the inter-communications between the TDCs 403 make them serve as a Pulse De-Multiplexer as well. For example, in the embodiment of FIG. 5(a), TDC1 handles the positive pulses (low-to-high transitions), and TDC2 handles the negative pulses (high-to-low transitions). As long as the clock rate of the periodic clock (clock_1x) is faster than the rates of positive and negative pulses (and not the combined rate that counts positive and negative pulses together) in pulse train 401, there will not be a problem in interpreting pulse train 401 (the data transitions in pulse train 401 will not show up before a TDC is ready to respond to the transition). The same basic concept applies to the generic embodiment of FIG. 5(d), which has 2N TDCs 403. These 2N TDCs 403 and there inter communication de-multiplex the input pulse train 401 into N non-overlapped positive pulse channels (PW1, PW3, . . . PW(2N−1)), and N non-overlapped negative pulse channels (PW2, PW4, . . . PW(2N)). So the value of the number N and the clock rate of the periodic clock (clock_1x) are selected so that a data transitions in pulse train 401 will not show up before a TDC 403 is ready to respond to the transition. Of course, if N>1 then the hardware implementation is more complex in terms of the numbers of the various elements shown in the embodiment of FIG. 5(d) which are utilized. If N=1, then the implementation is less complex in terms of the numbers of the same basic elements as shown by the embodiment of FIG. 5(a). But if a conceptually less complex design (such as the embodiment of FIG. 5(a)) is desired, then as the rate of the positive/negative pulse increases, the speed required for the clock (clock_1x) increases correspondingly, and that fact can make the implementation of individual basic elements shown in the embodiment of FIG. 5(a) overall more difficult than using the embodiment of FIG. 5(d) with a clock clock_1x having a lower speed.

The value of N is selected based on the clock rate of the periodic clock (clock_1x) and how quickly a transition in pulse train 401 might occur. The value of M is selected based on the clock rate of the periodic clock (clock_1x) and how slowly a transition in pulse train 401 might occur. The value of P is established as described above.

The embodiments shown in FIGS. 5(a) and 5(d) can measure and digitize the sizes of the intervals of consecutive positive and negative pulses of an asynchronous input pulse train 401. Given an exemplary pulse train 401, shown at the top of FIG. 5(c) for example, a positive pulse interval is defined as an interval that starts from a rising edge to the next closet falling edge, and a negative pulse interval is defined as an interval that starts from a falling edge to the next closet rising edge when the pulse train 401 is in the pulse domain. However, as will be seen with reference to FIGS. 7(a) and 7(b), the pulse train 401 may occur in the spike domain (see spike train 401' of FIG. 7(a)) if a spike domain to pulse domain converter 700 (see FIG. 7(b)) is utilized. In the spike domain the spikes (or data transitions t1-t8) can all be positive. In the pulse domain (and after the spike domain pulse train 401' is converted to a pulse domain pulse train 401 when the data being applied is in the spike domain), data transitions t1-t8 also can be seen, but in the pulse domain they occur at leading and trailing edges of pulses).

Figure 7A:
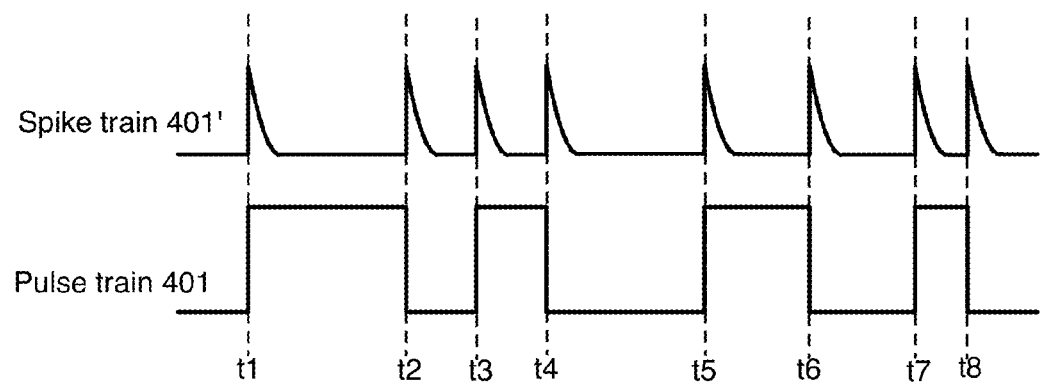
FIG. 7(a) depicts exemplary data in the spike domain along with the same data in the pulse domain.

See FIG. 5(c) which depicts pulse intervals of [t1 t2], [t3 t4], [t5 t6], and [t7 t8] which are regarded as positive pulse intervals and pulse intervals of [t2 t3], [t4 t5], and [t6 t7] which are regarded as negative pulse intervals. The same intervals are also depicted by FIG. 7(a) for the equivalent spike domain pulse train 401'. The TDC1 in FIG. 5(a) generates the quantized measurement values of the positive intervals of [t1 t2], [t3 t4], [t5 t6], and [t7 t8] after the falling edges of the pulse domain pulse train at t2, t4, t6, and t8, respectively. These quantized measurements are denoted as Q(t2-t1), Q(t4-t3), Q(t6-t5) and Q(t8-t7) in FIG. 5(c). Meanwhile, the TDC2 in FIG. 5(a) generates the quantized measurement values of the negative intervals of [t2 t3], [t4 t5], and [t6 t7] after the rising edges of the pulse domain pulse train at t3, t5, and t7, respectively. These quantized measurements are denoted as Q(t3-t2), Q(t5-t4) and Q(t7-t6) in FIG. 5(c). The embodiment of FIG. 5(d) is conceptually similar, except that the input pulse train 401 is de-multiplexed into N non-overlapped positive pulse channels (PW1, PW3, . . . PW(2N−1)), and N non-overlapped negative pulse channels (PW2, PW4, . . . PW(2N)).

It can be seen from FIG. 5(i), there are P delayed-versions of the input signal (pulse train 401). Only one of them passes through the P-to-1 MUX, which is controlled by the pd_ctrl signal. The value of pd_ctrl can be preferably adjusted or programmed as is described above by establishing the value of P which in turn is based on the setup time requirement of the Async-to-Sync1,2 (408$_{1,2}$).

The method of generating the quantized measurements for these positive and negative pulse intervals is now described with reference to FIG. 5(e) as follows using an exemplary version of a pulse train 401, which exemplary pulse train as shown in FIG. 5(c). In FIG. 5(e), initially, right after the power-on reset (see block 500), which happens before t1 shown in FIG. 5(c), the next output (next1) of TDC1 is set to logic 0 at one MUI after POR, and the next output (next2) of TDC2 is driven from a low level (logic 0) to a high level (logic 1) due to the logic 420 depicted at the lower right hand corner of FIG. 5(f) which logic is explained above. See block 502. Therefore, TDC2 cannot do any measurement (see block 505), but TDC1 can do that (see block 503) once its start pin or input (start1) is triggered by a rising edge signal (as detected at block 504 with TDC1 counting as reflected by block 506). When the pulse train 401 arrives at input1, its rising edge at t1 will trigger TDC1 to start counting (see block 506), and the next output (next1) of TDC1 will assert to logic 1 (see block 508), and this assertion lasts for one MUI (see blocks 510 and 511) to place TDC2 in a standby state, waiting for the next falling edge. At time t2, the falling edge of the pulse train triggers TDC1 to stop counting (see blocks 512 and 514), and TDC2 to start counting (see blocks 507 and 516). A one-MUI positive pulse will be generated at the next pin (next2) of TDC2 (see blocks 518, 520, and 521) to place TDC1 in a standby mode again, waiting for the next rising edge in the pulse train 401. The quantized counting value, Q(t2-t1), of the positive pulse interval [t1 t2] will be available on the output bus PW1 of TDC1 after the falling edge at t2 (see block 540). When this rising edge arrives at t3, the rising edge in the exemplary pulse train 401 triggers TDC2 to stop counting (see blocks 522 and 524), and triggers TDC1 to start counting again (see block 504). The quantized counting value, Q(t3-t2), of the negative pulse [t2 t3] will be available on the output bus PW2 of TDC2 after the rising edge at t3 (see block 534). At the rising edge at t3, TDC1 starts counting the positive pulse interval of [t3 t4] just as it did for interval [a t2]. Following the same sequence described in above, TDC2 then starts counting the negative pulse interval of [t4 t5] at the falling edge t4. Essentially, TDC1 and TDC2 count the positive and negative pulse intervals, respectively and alternatively.

Blocks 508, 510 and 511 indicate that the output 'next1' de-asserts to logic 0 one MUI after the TDC1 stops counting (block 506). Blocks 542, 544 and 546 indicate that the output 'rdy1' asserts to logic 1 after the PW1 updates (block 540), and this assertion lasts for K MUI to satisfy the setup time needs of CTRL 402. Blocks 518, 520 and 521 indicate that the output 'next2' de-asserts to logic 0 one MUI after the TDC2 starts counting (block 516). Blocks 526, 530 and 532 indicate that the output 'rdy2' asserts to logic 1 after the PW2 updates (block 534), and this assertion lasts for K MUI. The ready signals rdy1 and rdy2 respectively indicate the availability of quantized data on outputs PW1 and PW2.

Figure 1:
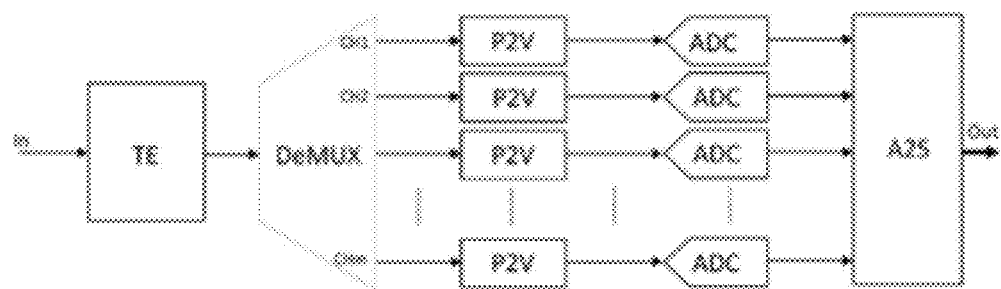
FIG. 1 depicts a prior art circuit capable of measuring and digitizing the intervals of consecutive positive and negative pulses of an asynchronous pulse train in the pulse domain.
Figure 2:
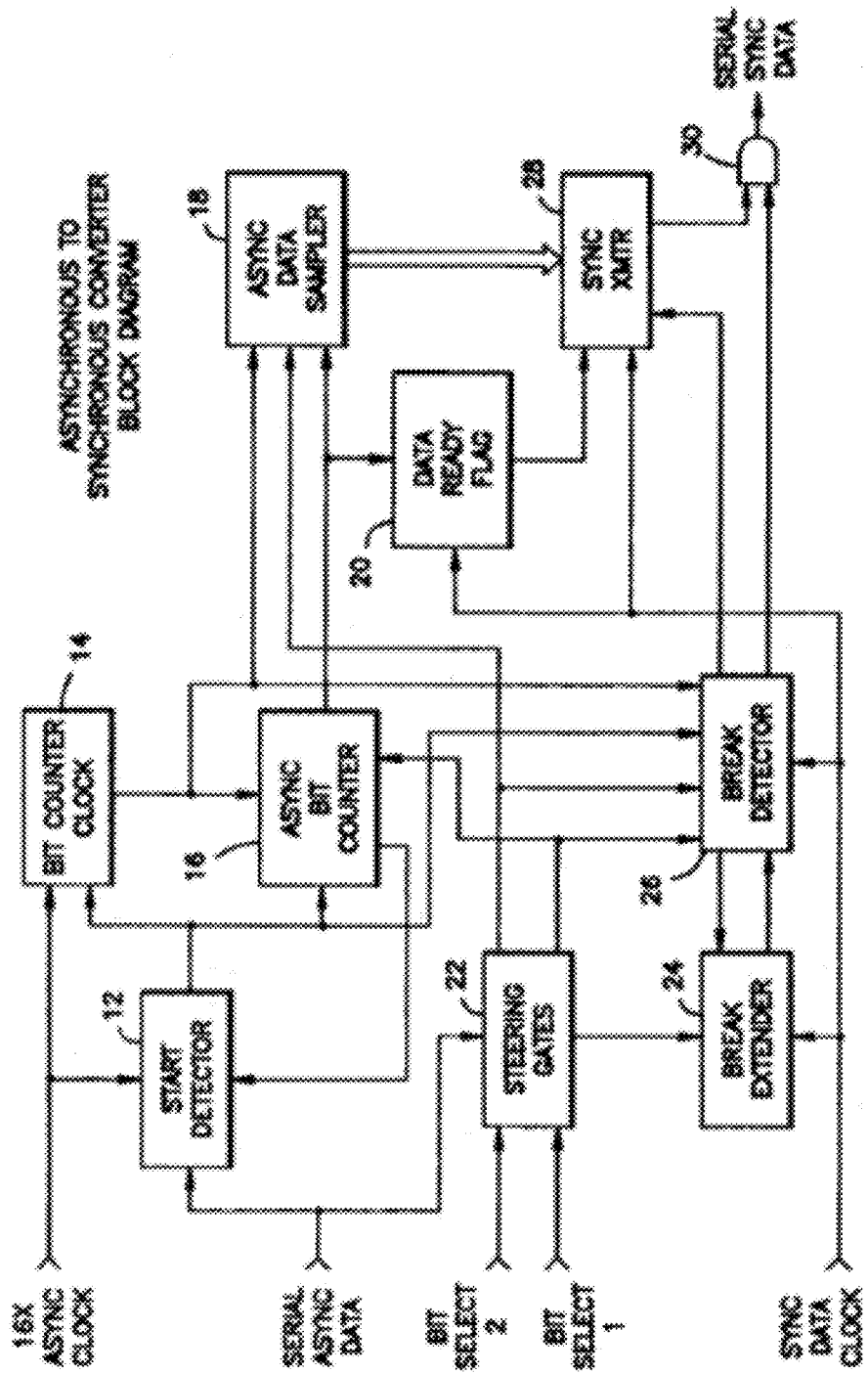
FIG. 2 depicts a prior art asynchronous and synchronous converter (from U.S. Pat. No. 5,268,934).
Figure 3:
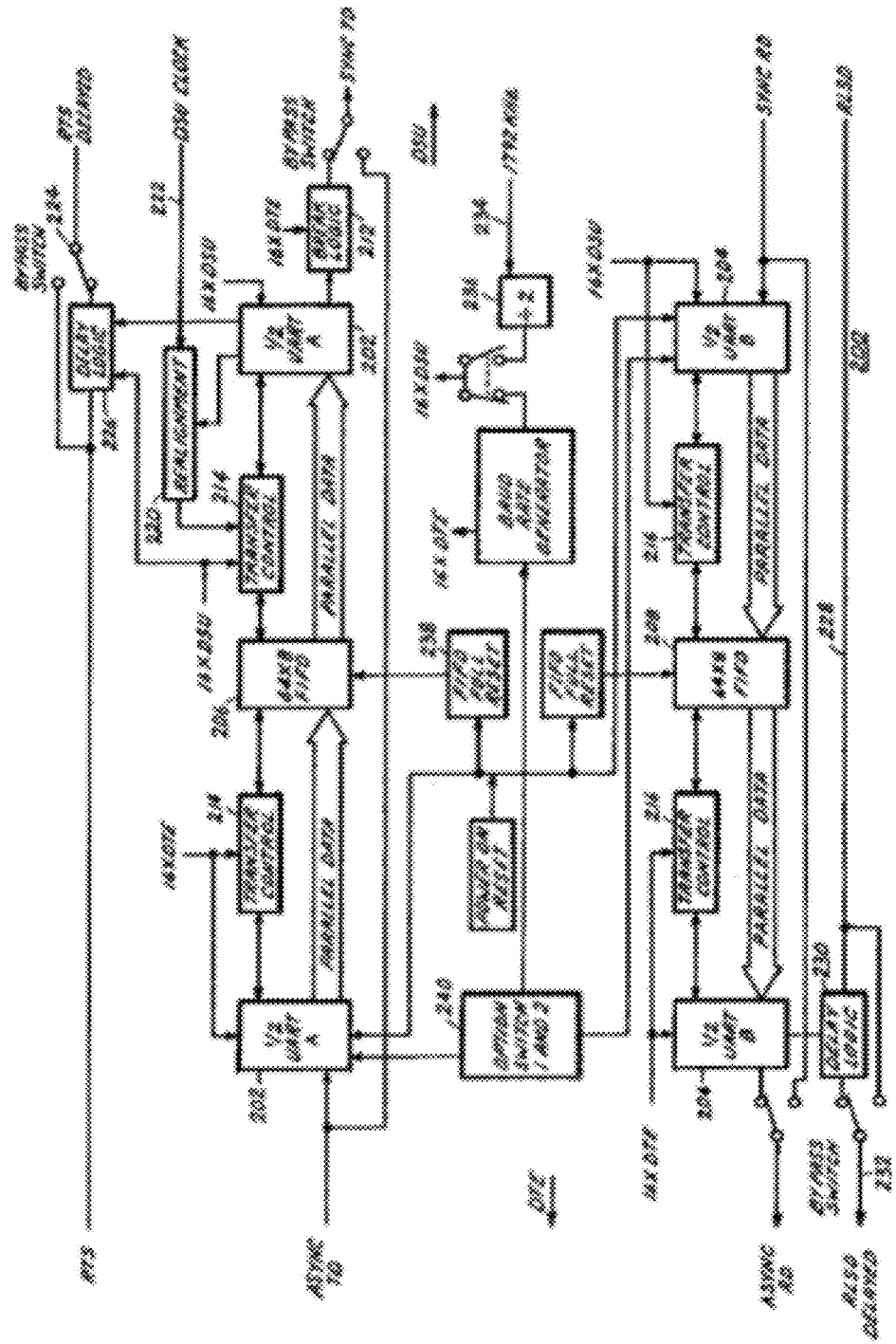
FIG. 3 depicts a prior art asynchronous data interface circuit (from U.S. Pat. No. 4,586,189).
Figure 4:
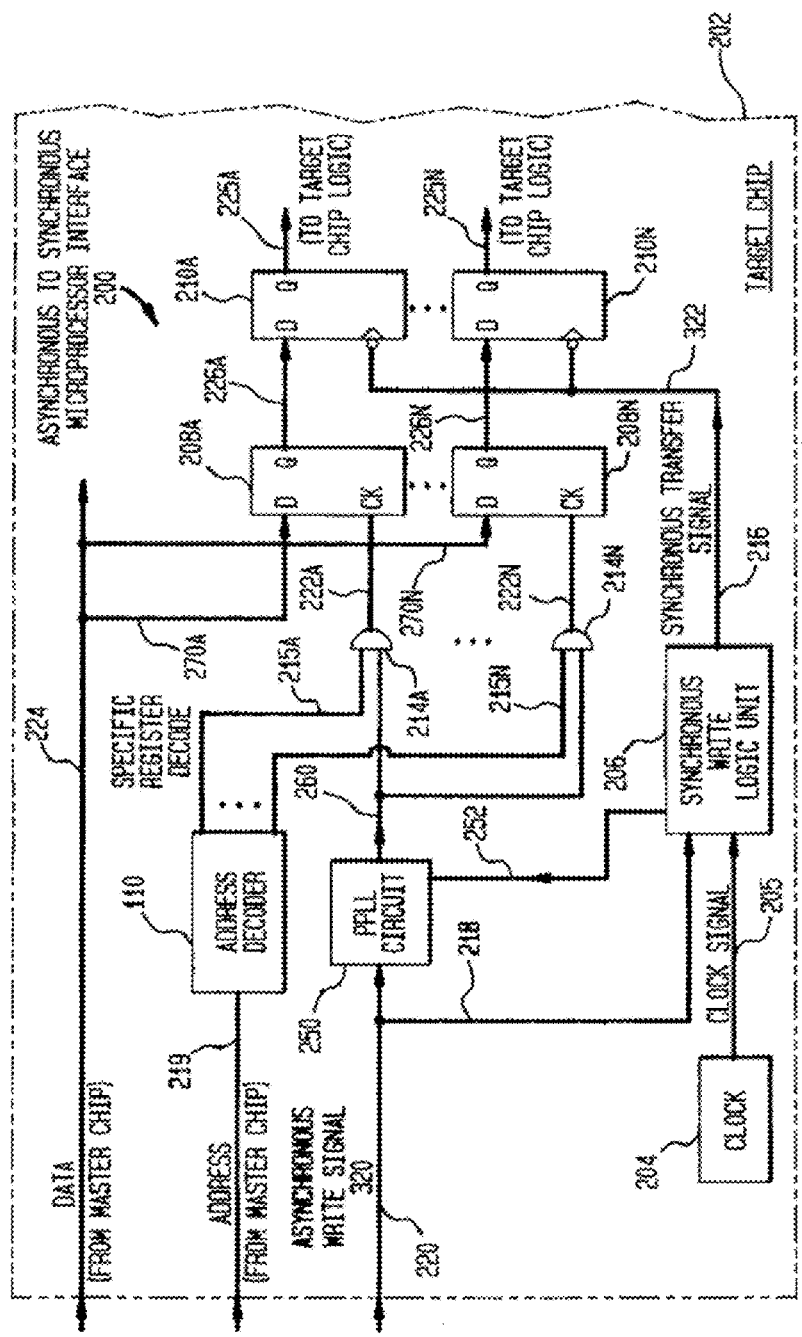
FIG. 4 depicts depicts a prior art asynchronous and synchronous interface (from U.S. Pat. No. 5,522,048).

The embodiment in FIG. 5(a) is expanded to a more generic embodiment shown in FIG. 5(d), or the embodiment in FIG. 5(a) can be regarded as a simplest case derived from the embodiment in FIG. 5(d) where N=1 in the case of the embodiment of FIG. 5(a). The embodiment in FIG. 5(d) consists of 2N TDCs (403$_1$ . . . 403$_{2N}$), 2N programmable delay lines (400$_1$ . . . 400$_{2N}$), 2N asynchronous-to-synchronous interfaces (408$_1$ . . . 408$_{2N}$), one 2N-to-one multiplexer (MUX 410'), one enable generator (EN_GEN) 412 and one controller (CTRL) 402'. This version of the controller 402' needs to be modified to generate the additional pd_ctrl and rdy state signals and the modification of CRTL 402' should be within in the skill of the person skilled in this art based on the teachings contained herein. Also the MUX 410' is typically larger than the MUX 410 of FIG. 4(a). Similar to the 2-to-1 MUX 410 of FIG. 5(a), the 2N-to-1 MUX 410' of FIG. 5(d) generates the periodic clock (clock_1x), of which the frequency is ½N of the input clock (clock_2Nx).

The embodiment of FIG. 5(d) should be able to handle higher data rates than the embodiment of FIG. 5(a) (for a given clock rate) for the reasons stated above. So in the embodiment of FIG. 5(a), which only has two TDCs (TDC1 and TDC2), let us assume that the average rates of positive pulse and negative pulse in the pulse train 401 are for example 100 MHz, and the rate of the periodic clock (clock_1x) is set to 150 MHz (=100 MHz×1.5)—the value 1.5 just being an empirical value to help ensure that the rate/speed of the periodic clock (clock_1x) is faster than the rate of positive/negative pulse-to handle PW1 and PW2 through the two Async-to-Sync ($408_1$ and $408_2$). Applying the same assumed pulse train to the embodiment of FIG. 5(d), if N is set to equal 2, then the pulse rates of the four TDCs' outputs (PW1, PW2, PW3, and PW4) are 50 MHz, so then periodic clock (clock_1x) can be set to 75 MHz (50 MHz×1.5), making the designs of the TDCs 403 easier from a speed of operation requirement, but requiring more of them (the TDCs 403) to compensate for the lower speed of operation. In other words, given the same periodic clock rate, the embodiment of FIG. 5(d) (with N>1) can handle a pulse train 401 with a faster pulse rate than the embodiment of FIG. 5(a) (with N=1) can handle.

It should now be noted that the embodiments of the asynchronous pulse domain to synchronous digital domain converter of FIGS. 5(a) and 5(d) are arranged in a ring configuration. In the embodiment of FIG. 5(d) the ring has 2N counters arranged in N stages, a 1st stage (see TDCs $403_1$ and $403_2$) thereof comprising a first pair of counters, the first counter of this 1st stage (TDC1 $403_1$) having a next1 output coupled a gate2 input of the second counter of the 1st stage (TDC2 $403_2$), and a 2nd stage (see TDCs $403_3$ and $403_4$) comprising a second pair of counters, the first counter of said 2nd stage (TDC3 $403_3$) having a gate3 input coupled to a next2 output of the preceding second counter of the 1st stage (TDC2 $403_2$), the first counter of the 2nd stage (TDC3 $403_3$) having a next3 output coupled a gate4 input of the second counter of said 2nd stage (TDC4 $403_4$), the second counter of the 2nd stage (TDC4 $403_4$) having a next4 output which would be coupled to a gate1 input of first counter of the 1st stage (TDC1 $403_1$) if N=2, thereby completing the ring when N=2. In the embodiment of FIG. 5(a) the ring has just 2 counters with N=1.

For N>2, then the second counter of the 2nd stage (TDC4 $403_4$) has its next4 output coupled to a gate(2N−1) input of first counter of a following stage (TDC(2N−1) $403_{2N-1}$), the first counter of the following stage (TDC(2N−1) $403_{2N-1}$) having a next(2N−1) output coupled to a gate(2N) input of a first counter of the following stage (TDC(2N) $403_{2N}$). Only three stages are fully shown by FIG. 5(d), it being understood that the number of stages could be in excess of three (so then N>3) if needed as the circuit representation of FIG. 5(d) allows for N to be greater than 3. In any event in the final stage of this ring configuration, the second counter thereof (TDC(2N) $403_{2N}$) has a next(2N) output which is then coupled to the gate1 input of the first counter in the 1st stage thereby completing the ring.

Turning once again to FIG. 5(a), the 2-to-1 MUX 410 multiplexes the output data of asynchronous-to-synchronous interfaces $408_1$ and $408_2$ into an output stream (mux_data) of synchronous digital domain signals 411, running at the clock rate of ($2/t_{clock\_1x}$). The 2-to-1 MUX starts multiplexing when the en signal is driven to logic 1 by EN_GEN. The EN_GEN module asserts the en signal to logic 1 at M×clock cycles of clock_1x after the power-on reset, where M is a positive integer. The same operations occur in the embodiment of FIG. 5(d). That is, the 2N-to-1 MUX (410') starts multiplexing when the 'en' signal is driven to logic 1 by EN_GEN (412). The EN_GEN module asserts the 'en' signal to logic 1 at M clock cycles of clock_1x after the power-on reset, where M is a positive integer.

Figure 6A:
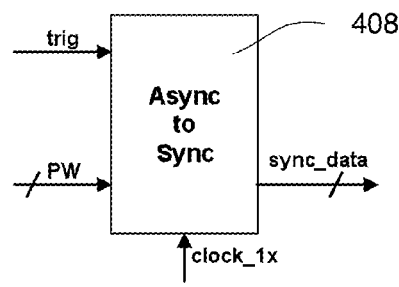
FIG. 6(a) shows the I/O ports of the asynchronous-to-synchronous interface used in the embodiments in FIG. 5(a) and FIG. 5(e).
Figure 6B:
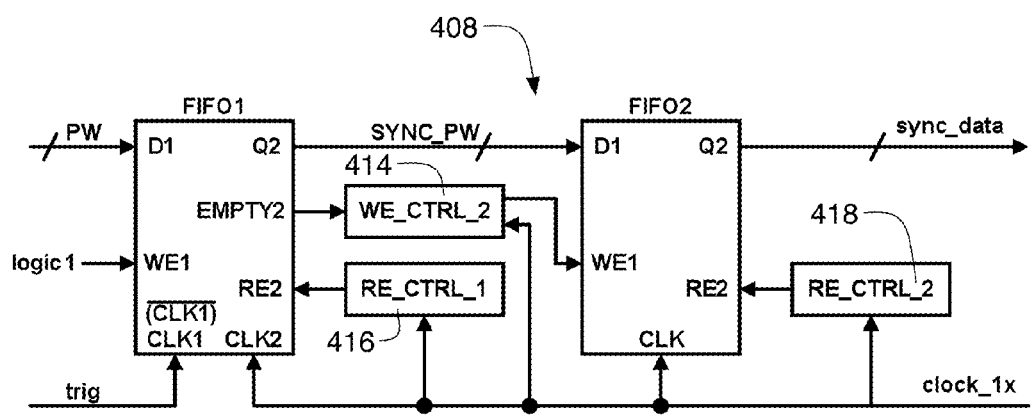
FIG. 6(b) is a block diagram showing an embodiment internal components of the asynchronous-to-synchronous interface of FIG. 6(a).

FIG. 6(a) shows the I/O ports of the asynchronous-to-synchronous interface 408 used in the embodiments in FIG. 5(a) and FIG. 5(d). The asynchronous-to-synchronous interfaces 408 used in FIGS. 5(a) and 5(d) each has two inputs (trig and clock_1x), one input bus (PW) and one output bus (sync_data). The output bus updates synchronously to the clock_1x input.

As shown in FIG. 6(b), the asynchronous-to-synchronous interface 408 preferably comprises two first-in-first-out (FIFO) modules FIFO1 and FIFO2, two read control modules RE_CTRL_1 416 and RE_CTRL_2 418, and one write control module WE_CTRL_2 414. FIFO1 is a dual-port FIFO that has two independent clock inputs (CLK1 and CLK2) for its write-in (D1, WE1) and read-out ports (Q2, RE2, and EMPTY2), respectively. FIFO2 is a single-port FIFO that has one clock pin (CLK) for both of its write-in port (D1 and WE1) and read-out port (Q2 and RE2).

The connections among the elements shown in FIG. 6(b) are now described as follows. At the write-in port of FIFO1, the write-in bus D1, and the clock pin CLK1 serve as the input bus PW and the input trig of the asynchronous-to-synchronous interface 408, respectively. Moreover, the input pin WE1, which enables the write-in function of FIFO1, is driven by a logic 1 level after the power-on reset occurs. At the read-out port of FIFO1, the read-out data Q2 is coupled to the write-in bus D1 of FIFO2, and the clock pin CLK2 serves as the input for clock_1x of the asynchronous-to-synchronous interface 408. In addition, the output pin EMPTY2, which asserts to logic 1 whenever FIFO1 is empty, connects to the WE_CTRL_2 module 414 (which is shown in greater detail by FIG. 6(f)). Furthermore, the input pin RE2, which enables the read-out function of FIFO1, receives the output signal from RE_CTRL_1 module 416 (which is shown in greater detail by FIG. 6(g)) that is driven by the input pin clock_1x of the asynchronous-to-synchronous interface 408.

At the write-in port of FIFO2, the input pin WE1, which enables the write-in function of FIFO2, receives the output signal from WE_CTRL_2 module 414. The write-in bus D1, as described previously, accepts data from the read-out bus Q2 of FIFO1. At the read-out port of FIFO2, the read-out bus Q2 serve as the output bus sync_data of the asynchronous-to-synchronous interface. The input pin RE2, which enables the read-out function of FIFO2, receives the output signal of the RE_CTRL_2 module 418 (which is shown in greater detail by FIG. 6(h)) that is driven by the input pin clock_1x of the asynchronous-to-synchronous interface. In addition, the input pin CLK of FIFO2 is driven by the clock_1x pin as well. FIFO1 and FIFO2 are preferably a standard off the shelf asynchronous FIFO and a standard off the shelf synchronous FIFO, respectively. It is common that a standard off the shelf FIFO provides empty indication flag like the 'EMPTY2' in FIFO1.

Figure 6C:
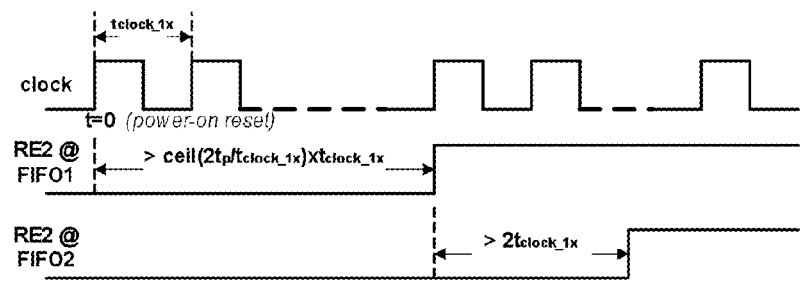
FIG. 6(c) is a timing diagram relating to RE_CTRL_1 setting RE2 to logic 1 at some amount of time after the power-on reset.
Figure 6D:
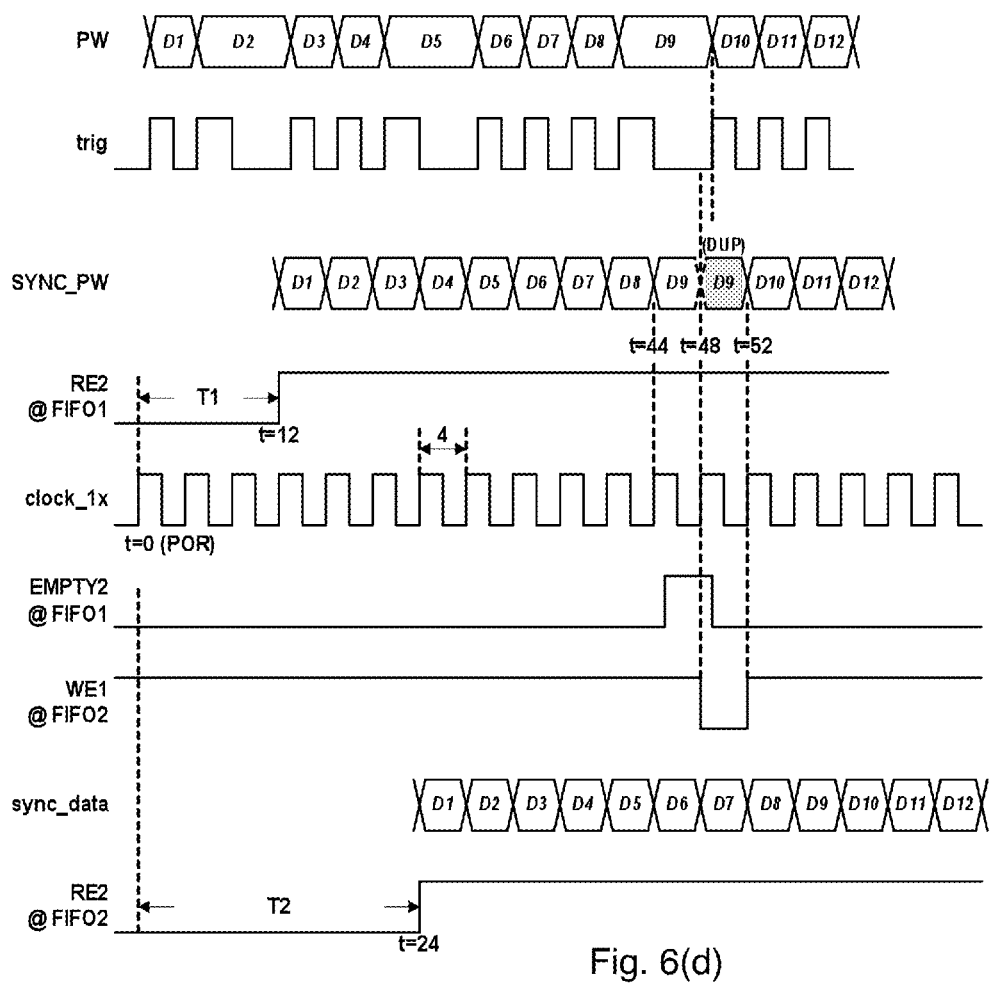
FIG. 6(d) shows exemplary waveforms at various ports and pins of the embodiment of the asynchronous-to-synchronous interface shown in FIG. 6(b) during the conversion of the asynchronous data arriving at the input bus PW to synchronous data at the output bus sync_data.
Figure 6E:
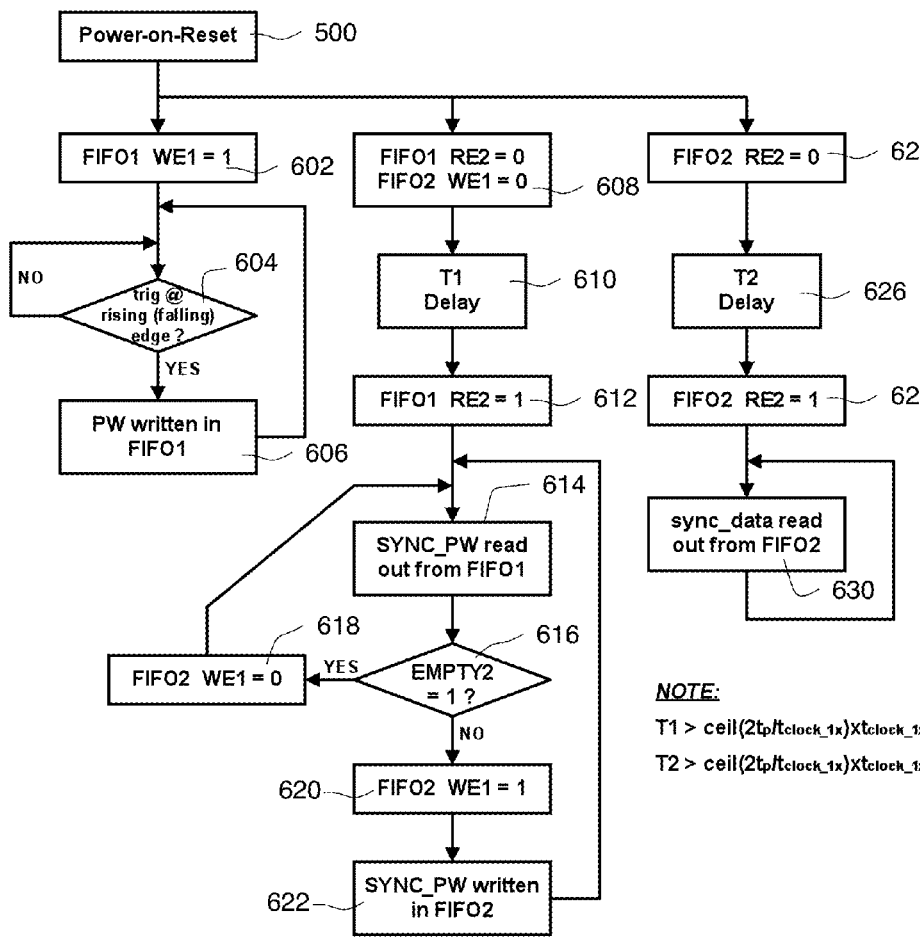
FIG. 6(e) is a flow diagram which summarizes the steps performed in the conversion process whose waveforms are depicted by FIG. 6(d).
Figure 6F:
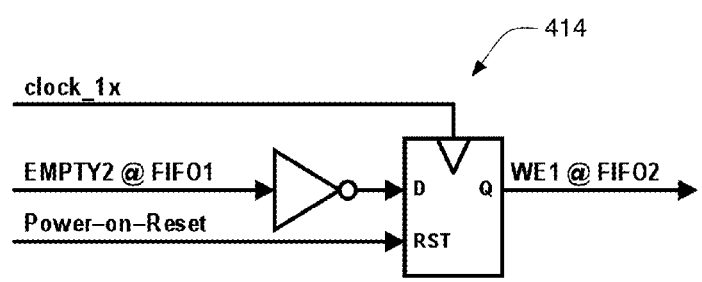
FIG. 6(f) depicts the WE_CTRL_2 module (shown on FIG. 6(b)) in greater detail.
Figure 6G:
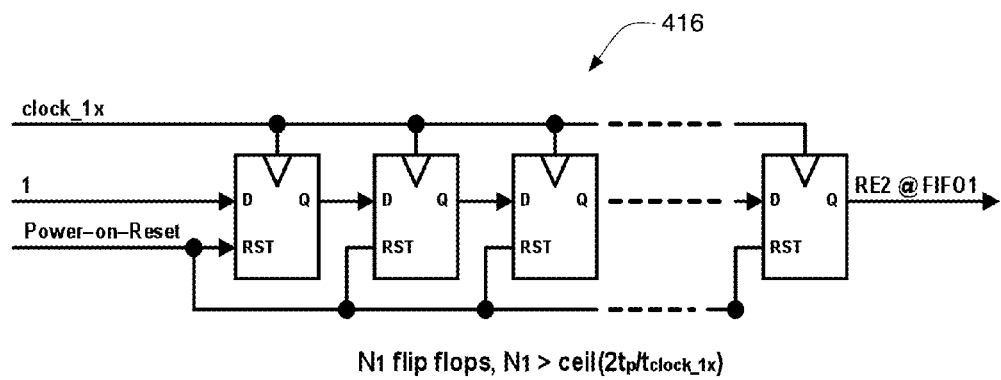
FIG. 6(g) depicts the RE_CTRL_1 module (also shown on FIG. 6(b)) in greater detail.
Figure 6H:
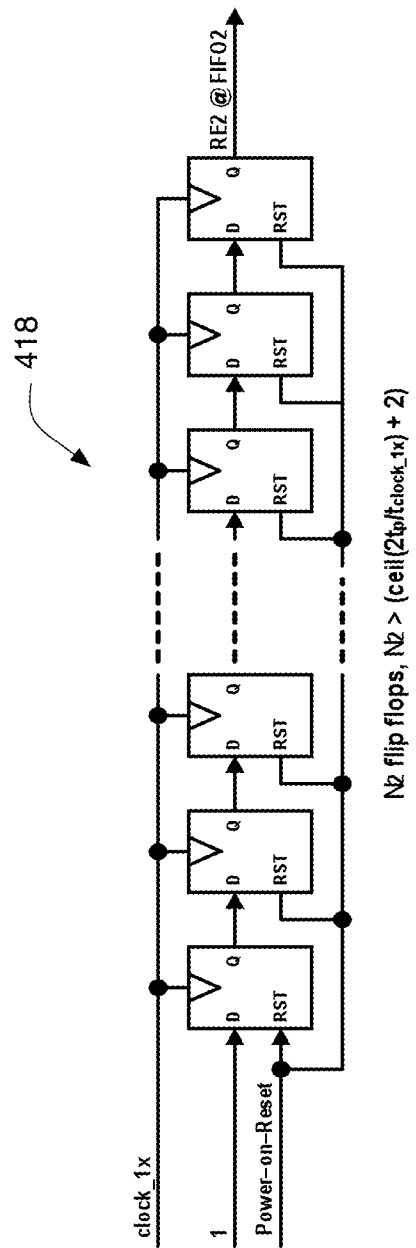
FIG. 6(h) depicts the RE_CTRL_2 module (shown on FIG. 6(b)) in greater detail.

The method of converting the asynchronous data to the synchronous data is now described as follows with reference to the timing diagram of FIG. 6(d). At the write-in port of FIFO1, since WE1 is set to logic 1 (at block 602 after the power-on reset—see block 500 of FIG. 5(g1)), the asynchronous data (provided by a TDC on bus PW in the previous stage) on D1 are written into FIFO1 at the rising (or falling) edge of CLK1 (see blocks 604 and 606), CLK1 being provided by one of the programmable delay lines (also in the previous stage). At the read-out port of FIFO1, whenever RE2 is set to logic 1 (see block 612) by the RE_CTRL_1 module, the written-in data are read out at the rising edge of CLK2 (see block 614), which is driven by the periodic clock clock_1x. The RE_CTRL_1 module sets input RE2 to logic 1 at some amount of time after the power-on reset (see blocks 608 and 610). As shown in FIG. 6(c), this time is set longer than [ceil $(2t_p/t_{clock\_1x})$]× tclock_1x where ceil $(2t_p/t_{clock\_1x})$ stands for minimal integer of $(2t_p/t_{clock\_1x})$, $t_p$ is the average pulse interval of the asynchronous data, and $t_{clock\_1x}$ is the clock period of clock_1x. When FIFO1 is empty, EMPTY2 asserts to logic 1, and Q2 (of FIFO1) holds the data of previous read-out (DUP). WE_CTRL_2 checks EMPTY2 (see block 616), and control WE1 of FIFO2 (see blocks 618 and 620) to determine whether the read-out data of FIFO1 should be written into FIFO2 (see block 622). Through this control, the duplicative FIFO1 read-out data (DUP) caused by the FIFO1 emptiness will not be written into FIFO2 (as shown in FIG. 6(b), when the output of RE_CTRL_1 is high, the FIFO1 keeps reading (at Q2) because the read clock (CLK2) is driven by a continuous periodic (i.e. synchronous) clock (clock_1x in FIG. 6(d)). At the read-out port of FIFO2, whenever RE2 is set to logic 1 by RE_CTRL_2, the written-in data are read out at the rising edge of CLK (see block 630), which is driven by the periodic clock clock_1x. The RE_CTRL_2 module sets RE2 of FIFO2 to logic 1 at some amount of time after RE2 of FIFO1 is set to logic1 (see blocks 624, 626, 628, 608, 610, and 612). As shown in FIG. 6(c), this time is set longer than $2t_{clock\_1x}$. Through the two FIFOs and various control modules introduced above, the asynchronous data arriving at the input bus PW are converted to the synchronous data at the output bus sync_data without unnecessary duplicative data as a result of a data rate mismatch between the asynchronous and synchronous data. FIG. 6(d) shows exemplary waveforms at various ports and pins of the embodiment shown in FIG. 6(b) for such conversion process. The steps for this conversion method are summarized in FIG. 6(e).

FIG. 6(d) depicts exemplary waveforms at various ports and pins of the embodiment shown in FIG. 6(b) for the aforementioned conversion process. In this example, the data supplied asynchronously at PW are written into FIFO1 at each rising edge of the trig signal, which is an asynchronous pulse train. The average pulse interval, tp, is approximated as 2.5 (since in a time period of 60, there are 24 pulse intervals, including both positive and negative ones). In addition, the clock period of clock_1x (tclock_1x) is set to 4. Based on the discussion in the preceding paragraph, the RE2 of FIFO1 is set to assert to logic 1 at t=12, which is larger than [ceil(2tp/tclock_1x)]×tclock_1x, and referred as T1 in FIG. 6(e). Therefore, from t=12, the data written into FIFO1 start being read out at SYNC_PW, and these readout data are subsequently written into FIFO2 when WE1 of FIFO2 is logic 1 (WE1 of FIFO2 is asserted to logic 1 by WE_CTRL_2 after the power-on-reset at t=0). At t=44, D9 is read out from FIFO1, and FIFO1 becomes empty since D10 is written in FIFO1 after the next FIFO1 readout (at t=48). This next readout data is still D9. In addition, the EMPTY2 of FIFO1 asserts to logic 1 after t=44, and de-asserts to logic 0 after t=48. The WE_CTRL_2 inverts EMPTY2 and synchronizes it with clock_1x to make WE1 of FIFO2 de-assert to logic 0 at t=48, and assert to logic 1 at t=52. This de-assertion prevents the duplicative D9 at SYNC_PW being written into FIFO2. Based again on on the discussion in the preceding paragraph, RE2 of FIFO2 is set to assert to logic 1 at t=24, which is referred as T2 shown in FIG. 6(e). The difference between T1 and T2 (the RE2 assertions of FIFO1 and FIFO2) is 12, which is larger than 2×tclock_1x. As shown in FIG. 6(d), from t=24, the data written into FIFO2 start being read out at sync_data. It can be seen that the data supplied asynchronously at PW are provided synchronously at sync_data.

Figure 7B:
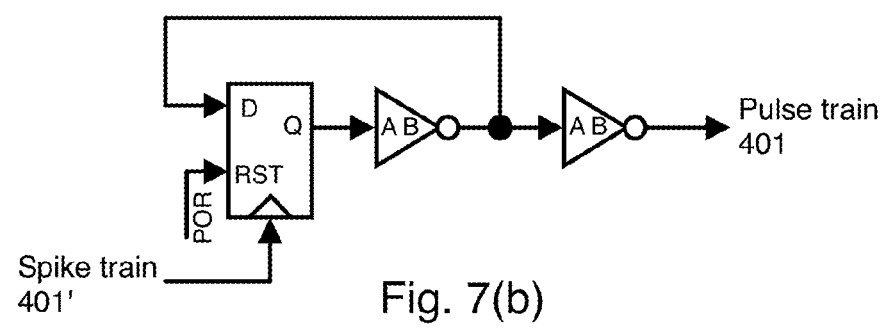
FIG. 7(b) depicts a circuit for converting a spike domain signal to the pulse domain.

As is briefly mentioned above, the disclosed Asynchronous Pulse Domain to Synchronous Digital Domain Converter can also process a spike train 401', as is shown in FIG. 7(a), instead of a pulse domain pulse train 401, by using a spike train to pulse train converter 700 at the input of inverter 406 shown in FIG. 5(a). FIG. 7(b) shows the basic structure of one embodiment of a spike train to pulse train converter 700. It consists of one flip-flop and two inverters. The spike train input 401' connects to the clock port of the flip-flop. Therefore, a spike, that is, a transition from low level (logic 0) to high level (logic 1) will flip the output of the flip-flop. This flip generates either a positive pulse or a negative pulse. Moreover, the output of the flip-flop will be reset to low level (logic 0) after a POR is applied on the reset port (RST) of the flip-flop of FIG. 7(b)

Having described the invention in connection with certain embodiments thereof, further modifications beyond those discussed above will now certainly suggest themselves to those skilled in the art. As such, the invention is not to be limited to the disclosed embodiments except as is specifically required by the appended claims.

The foregoing Detailed Description of exemplary embodiments is presented for purposes of illustration and disclosure in accordance with the requirements of the patent statute. It is not intended to be exhaustive nor to limit the invention to the precise form(s) described, but only to enable others skilled in the art to understand how the invention may be suited for a particular use or implementation. The possibility of modifications and variations will now be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising the step(s) of . . . ".

What is claimed is:

1. An asynchronous pulse domain to synchronous digital domain converter for converting pulse or spike domain signals in a input data stream to synchronous digital domain signals, the converter comprising:
   a. at least one pair of counters, a first counter of said at least one pair of counters starting to count in response to a data transition in said input data stream and stopping its count in response to a following data transition in said input data stream following the first mentioned data transition in said input data stream and a second counter of said at least one pair of counters starting to count in response to said following data transition in said input data stream and stopping its count in response to a data transition following said following data transition in said input data stream, the count counted by said first counter between one data transition and a following data transition in said input data stream being provided as asynchronous parallel data on a bus of said first counter and the count counted by said second counter between an immediately following data transition and a following data transition in said input data stream being provided as asynchronous parallel data on a bus of said second counter;

b. at least one pair of parallel asynchronous to synchronous interfaces, a first parallel asynchronous to synchronous interface of said at least one pair of parallel asynchronous to synchronous interfaces receiving the asynchronous parallel data from the first counter of said at least one pair of counters for synchronizing the asynchronous parallel data received therefrom with a first clock signal, a second parallel asynchronous to synchronous interface of said at least one pair of parallel asynchronous to synchronous interfaces receiving the asynchronous parallel data from the second counter of said at least one pair of counters for synchronizing the asynchronous parallel data received therefrom with a second clock signal; and c. a multiplexer arrangement for multiplexing the synchronized parallel data from the at least one pair of parallel asynchronous to synchronous interfaces onto an output bus.

2. The asynchronous pulse or spike domain to synchronous digital domain converter of claim 1 wherein said first and second clock signals are a common clock signal, that is, the first and second clock signals are identical to each other.

3. The asynchronous pulse or spike domain to synchronous digital domain converter of claim 1 wherein each of said at least one pair of parallel asynchronous to synchronous interfaces is triggered by a separate delay line associated with each of the interfaces.

4. An asynchronous pulse domain to synchronous digital domain converter for converting pulse domain signals in a input data stream to synchronous digital domain signals, the converter comprising:

at least one pair of counters, a first counter of said at least one pair of counters starting to count in response to a leading edge data transition in said input data stream and stopping its count in response to a following trailing edge data transition in said input data stream following the first mentioned leading edge data transition in said input data stream and a second counter of said at least one pair of counters starting to count in response to said following trailing edge data transition in said input data stream and stopping its count in response to a leading edge data transition following said following trailing edge data transition in said input data stream, the count counted by said first counter between a leading edge data transition and a following trailing edge data transition in said input data stream being provided as asynchronous parallel data on a bus of said first counter and the count counted by said second counter between an following trailing edge data transition and a following leading edge data transition in said input data stream being provided as asynchronous parallel data on a bus of said second counter;

at least one pair of parallel asynchronous to synchronous interfaces, a first parallel asynchronous to synchronous interface of said at least one pair of parallel asynchronous to synchronous interfaces receiving the asynchronous parallel data from the first counter of said at least one pair of counters for synchronizing the asynchronous parallel data received therefrom with a first clock signal, a second parallel asynchronous to synchronous interface of said at least one pair of parallel asynchronous to synchronous interfaces receiving the asynchronous parallel data from the second counter of said at least one pair of counters for synchronizing the asynchronous parallel data received therefrom with a second clock signal; and a multiplexer arrangement for multiplexing the synchronized parallel data from the at least one pair of parallel asynchronous to synchronous interfaces onto an output bus.

5. The asynchronous pulse domain to synchronous digital domain converter of claim 4 wherein said at least one pair of counters comprise 2N counters where N>1, said counters being associated in pairs and being arranged in a ring configuration, with a first counter of each said pair of counters starting to count in response to selected leading edge data transitions in said input data stream and stopping its count in response to trailing edge data transitions in said input data stream following the leading edge data transitions in said input data stream which started it to count and a second counter of each pair of counters starting to count in response to selected trailing edge data transitions in said input data stream and stopping its count in response to a leading edge data transition in said input data stream following the trailing edge data transition in said input data stream which started it to count, the count counted by each said first counters between a selected leading edge data transition and a following trailing edge data transition in said input data stream being provided as asynchronous parallel data on a bus of said first counters and the count counted by each said second counter between a selected trailing edge data transition and a following leading edge data transition in said input data stream being provided as asynchronous parallel data on a bus of said second counters.

6. The asynchronous pulse domain to synchronous digital domain converter of claim 4 further including:

an inverter for separating pulse domain signals in the stream of asynchronous pulse domain signals into first and second pulse data streams using an inverter, wherein the second pulse data stream is an inverse of the first pulse data stream, the first and second pulse data streams being coupled to said counters start or stop ports thereof so that a first counter of each pair starts counting, when enabled, in response to a data transition in the first stream and stops counting in response to an immediately following data transition in the second stream while a second counter of each pair starts counting, when enabled, in response to a data transition in the second stream and stops counting in response to an immediately following data transition in the first stream, the counters being sequentially and individually enabled for counting in the ring configuration thereof.

7. The asynchronous pulse domain to synchronous digital domain converter of claim 4 wherein said ring configuration has 2N counters arranged in N stages, a 1st stage thereof comprising a first pair of said counters, the first counter of said 1st stage having a next output coupled a gate input of the second counter of said 1st stage, and at least a 2nd stage thereof comprising a second pair of said counters, the first counter of said 2nd stage having a gate input coupled to a next output of the second counter of said 1st stage, the first counter of said 2nd stage having a next output coupled a gate input of the second counter of said 2nd stage, the second counter of said 2nd stage having a next output which is (i) coupled to a gate input of first counter of said 1st stage when N=2 or (ii) is coupled to a gate input of a first counter of a following stage, the following stages then continuing in a ring until a last stage occurs, in which case the second counter of said last stage having a next output which is coupled to a gate input of first counter of said 1st stage.

8. An asynchronous pulse domain to synchronous digital domain converter for converting pulse domain signals in an input asynchronous pulse domain data stream to synchronous digital domain signals in an output data stream, the converter comprising a plurality of counters arranged in a ring configuration with only one counter in said ring being responsive at any given moment to positive and negative going data transitions in said pulse domain signals, each counter when so responsive counting a number of instances of a measurement unit interval between either (i) a positive going data transition and an immediately following negative going data transition or (ii) a negative going data transition and an immediately following positive going data transition, the counts of the counters being utilized as the synchronous digital domain signals in said output data stream.

9. The asynchronous pulse domain to synchronous digital domain converter of claim 8 further including a plurality of parallel asynchronous to synchronous interfaces, a first pair of said parallel asynchronous to synchronous interfaces of said plurality of parallel asynchronous to synchronous interfaces receiving asynchronous parallel data from at least one pair of said plurality of counters for synchronizing the asynchronous parallel data received therefrom with a clock signal.

10. The asynchronous pulse domain to synchronous digital domain converter of claim 9 wherein in each pair of parallel asynchronous to synchronous interfaces and in each pair of said plurality of counters, a first one of said pair of parallel asynchronous to synchronous interfaces is coupled with a first one of said pair of counters and a second one of each pair of parallel asynchronous to synchronous interfaces is coupled with a second one of said pair of counters, the first one of said pairs being responsive to positive going data transitions in said pulse domain signals for counting the number of instances of measurement unit interval(s) between a positive going data transition and an immediately following negative going data transition and the second one of said pairs being responsive to negative going data transitions in said pulse domain signals for counting the number of instances of measurement unit interval(s) between a negative going data transition and an immediately following positive going data transition.

11. An asynchronous pulse domain to synchronous digital domain converter for converting pulse domain signals in an input asynchronous pulse domain data stream to synchronous digital domain signals in a output data stream, the converter comprising a plurality of counters arranged in a ring configuration with only one counter in said ring being responsive at any given time to positive and negative going data transitions in the input asynchronous pulse domain data stream, each counter, when so responsive, counting a number of time units between either (i) a positive going data transition and an immediately following negative going data transition or (ii) a negative going data transition and an immediately following positive going data transition, the counts of the counters when so responsive being synchronously output as synchronous digital domain signals in the output data stream.

12. A method of converting a stream of asynchronous pulse domain signals into a stream of synchronous digital domain signals, the method comprising:
separating pulse domain signals in the stream of asynchronous pulse domain signals into first and second pulse data streams using an inverter, so that the second pulse data stream is an inverse of the first pulse data stream;
applying both the first and second streams to pairs of counters and arranging said pairs of counters in a ring configuration thereof, so that a first counter of each pair starts counting, when enabled, in response to a data transition in the first stream and stops counting in response to an immediately following data transition in the second stream while a second counter of each pair starts counting, when enabled, in response to a data transition in the second stream and stops counting in response to an immediately following data transition in the first stream, the counters being sequentially and individually enabled for counting one at a time;
outputting the counts made by said counters as digital data; and
synchronizing the digital data and outputting the synchronized digital data as said synchronous digital domain signals.

13. An asynchronous pulse domain to synchronous digital domain converter for converting pulse domain signals in a input data stream to synchronous digital domain signals, the converter comprising at least one pair of counters, a first counter of said at least one pair of counters starting to count in response to a positive going data transition in said input data stream and stopping its count in response to a negative going data transition in said input data stream following the positive going data transition in said input data stream and a second counter of said at least one pair of counters starting to count in response to said negative going data transition in said input data stream and stopping its count in response to a positive going data transition in said input data stream following the negative going data transition in said input data stream, the count counted by said first counter between a positive going data transition and a following negative going data transition in said input data stream being provided as asynchronous parallel data on a bus of said first counter and the count counted by said second counter between a negative going data transition and a following positive going data transition in said input data stream being provided as asynchronous parallel data on a bus of said second counter;
at least one pair of parallel asynchronous to synchronous interfaces, a first parallel asynchronous to synchronous interface of said at least one pair of parallel asynchronous to synchronous interfaces receiving the asynchronous parallel data from the first counter of said at least one pair of counters for synchronizing the asynchronous parallel data received therefrom with a first clock signal, a second parallel asynchronous to synchronous interface of said at least one pair of parallel asynchronous to synchronous interfaces receiving the asynchronous parallel data from the second counter of said at least one pair of counters for synchronizing the asynchronous parallel data received therefrom with a second clock signal; and a multiplexer arrangement for multiplexing the synchronized parallel data from the at least one pair of parallel asynchronous to synchronous interfaces onto an output bus.

14. The asynchronous pulse domain to synchronous digital domain converter of claim 13 wherein said first and second clock signals are a common clock signal, that is, the first and second clock signals are identical to each other.

15. The asynchronous pulse domain to synchronous digital domain converter of claim 13 wherein each of said at least one pair of parallel asynchronous to synchronous interfaces is triggered by a separate delay line associated with each of the interfaces.

16. The asynchronous pulse domain to synchronous digital domain converter of claim 13 wherein said at least one pair of counters comprise 2N counters where N>1, said counters being associated in pairs and being arranged in a ring configuration, with a first counter of each said pair of counters starting to count in response to selected positive going data transitions in said input data stream and stopping its count in response to a negative going data transition in said input data stream following the positive going data transition in said input data stream which started it to count and a second counter of each pair of counters starting to count in response to selected negative going data transitions in said input data stream and stopping its count in response to a positive going data transition in said input data stream following the negative going data transition in said input data stream which started it to count, the count counted by each said first counter between a selected positive going data transition and a following negative going data transition in said input data stream being provided as asynchronous parallel data on a bus of said first counters and the count counted by each said second counter between a selected negative going data transition and a following positive going data transition in said input data stream being provided as asynchronous parallel data on a bus of said second counters.

17. The asynchronous pulse domain to synchronous digital domain converter of claim 13 further including:
an inverter for separating pulse domain signals in the stream of asynchronous pulse domain signals into first and second pulse data streams using an inverter, wherein the second pulse data stream is an inverse of the first pulse data stream,
the first and second pulse data streams being coupled to said counters start or stop ports thereof so that a first counter of each pair starts counting, when enabled, in response to a data transition in the first stream and stops counting in response to an immediately following data transition in the second stream while a second counter of each pair starts counting, when enabled, in response to a data transition in the second stream and stops counting in response to an immediately following data transition in the first stream, the counters being sequentially and individually enabled for counting in the ring configuration thereof.

18. The asynchronous pulse domain to synchronous digital domain converter of claim 13 wherein said ring configuration has 2N counters arranged in N stages, a 1st stage thereof comprising a first pair of said counters, the first counter of said 1st stage having a next output coupled a gate input of the second counter of said 1st stage, and at least a 2nd stage thereof comprising a second pair of said counters, the first counter of said 2nd stage having a gate input coupled to a next output of the second counter of said 1st stage, the first counter of said 2nd stage having a next output coupled a gate input of the second counter of said 2nd stage, the second counter of said 2nd stage having a next output which is (i) coupled to a gate input of first counter of said 1st stage when N=2 or (ii) is coupled to a gate input of a first counter of a following stage, the following stages then continuing in a ring until a last stage occurs, in which case the second counter of said last stage having a next output which is coupled to a gate input of first counter of said 1st stage.

19. The asynchronous pulse domain to synchronous digital domain converter of claim 13 further including a spike train to pulse train converter so that the asynchronous pulse domain to synchronous digital domain converter can convert an asynchronous spike domain pulse train to the digital domain, the spike train to pulse train converter having a pulse domain output coupled with said at least one pair of counters.

20. The asynchronous pulse domain to synchronous digital domain converter of claim 11 further including a spike train to pulse train converter so that the asynchronous pulse domain to synchronous digital domain converter can convert an asynchronous spike domain pulse train to the digital domain, the spike train to pulse train converter having a pulse domain output coupled with said plurality of counters.

* * * * *